US012195293B2

(12) United States Patent
Neutel

(10) Patent No.: US 12,195,293 B2
(45) Date of Patent: Jan. 14, 2025

(54) TAPE DISPENSER, A TAPE DISPENSER KIT, A ROLL OF MASKING TAPE AND A TAPE DISPENSER OPERATING METHOD

(71) Applicant: Mach Design B.V., Culemborg (NL)

(72) Inventor: Ronald Walter Neutel, Culemborg (NL)

(73) Assignee: Mach Design B.V., Culemborg (NL)

( * ) Notice: Subject to any disclaimer, the term of this patent is extended or adjusted under 35 U.S.C. 154(b) by 985 days.

(21) Appl. No.: 16/981,448

(22) PCT Filed: Mar. 11, 2019

(86) PCT No.: PCT/NL2019/050160
§ 371 (c)(1),
(2) Date: Sep. 16, 2020

(87) PCT Pub. No.: WO2019/177460
PCT Pub. Date: Sep. 19, 2019

(65) Prior Publication Data

US 2021/0024322 A1 Jan. 28, 2021

(30) Foreign Application Priority Data

Mar. 16, 2018 (NL) ...................................... 2020609
Oct. 16, 2018 (NL) ...................................... 2021826

(51) Int. Cl.
*B65H 35/00* (2006.01)
*B26D 5/08* (2006.01)

(52) U.S. Cl.
CPC ......... *B65H 35/0033* (2013.01); *B26D 5/083* (2013.01); *B65H 35/0086* (2013.01); *B65H 2601/321* (2013.01)

(58) Field of Classification Search
CPC ............ B65H 35/0033; B65H 35/0086; B65H 2601/326; B65H 2601/321
(Continued)

(56) References Cited

U.S. PATENT DOCUMENTS 3,574,042 A * 4/1971 McMullen ......... B65H 35/0033 156/577
4,104,110 A * 8/1978 Macosko ........... B65H 35/0033 156/577
(Continued)

FOREIGN PATENT DOCUMENTS

WO WO-9309050 A1 * 5/1993 ......... B65H 35/0033
WO WO-0112438 A1 * 2/2001 ......... B65H 35/0033
WO 2009021940 A2 2/2009

*Primary Examiner* — Nhat Chieu Q Do
(74) *Attorney, Agent, or Firm* — Schroeder Law PC

(57) ABSTRACT

A tape dispenser for applying masking tape for painting to an object. The dispenser includes a housing for accommodating a roll of masking tape, the roll of masking tape having a width and carrying a certain length of masking tape. The dispenser further includes a pressure surface for manually applying pressure to the object while a masking tape portion is present in between the pressure surface and the object in order to apply masking tape to an object, the pressure surface having a length and a width, and the pressure surface having an entry side and an exit side, wherein the housing and pressure surface are configured to guide masking tape from the roll of masking tape via the entry side of the pressure surface along the pressure surface towards the exit side of the pressure surface in a longitudinal direction of the pressure surface. The dispenser further includes a first cutter for cutting masking tape between the roll of masking tape and the entry side of the pressure surface seen in longitudinal direction and a second cutter for cutting masking tape downstream of the exit side of the pressure surface. The first and second cutters are movable between a first position wherein the first cutter performs a cutting action on a portion of masking tape upstream of the entry side of the pressure surface, an at rest position wherein masking tape can pass the first and second cutters without engagement, and a second position wherein the second cutter performs a cutting
(Continued)

action on a portion of masking tape downstream of the exit side of the pressure surface.

17 Claims, 28 Drawing Sheets

(58) Field of Classification Search
USPC ............................................................ 83/284
See application file for complete search history.

(56) References Cited

U.S. PATENT DOCUMENTS

| | | | | |
|---|---|---|---|---|
| 8,820,382 | B1* | 9/2014 | Renkert | B65H 35/0033 156/577 |
| 2007/0290018 | A1* | 12/2007 | Matechuk | B65H 35/0033 225/56 |
| 2008/0289770 | A1* | 11/2008 | Hsia | B65H 35/002 156/510 |
| 2016/0280497 | A1* | 9/2016 | Nguyen | B65H 35/0033 |

* cited by examiner

Fig. 13A
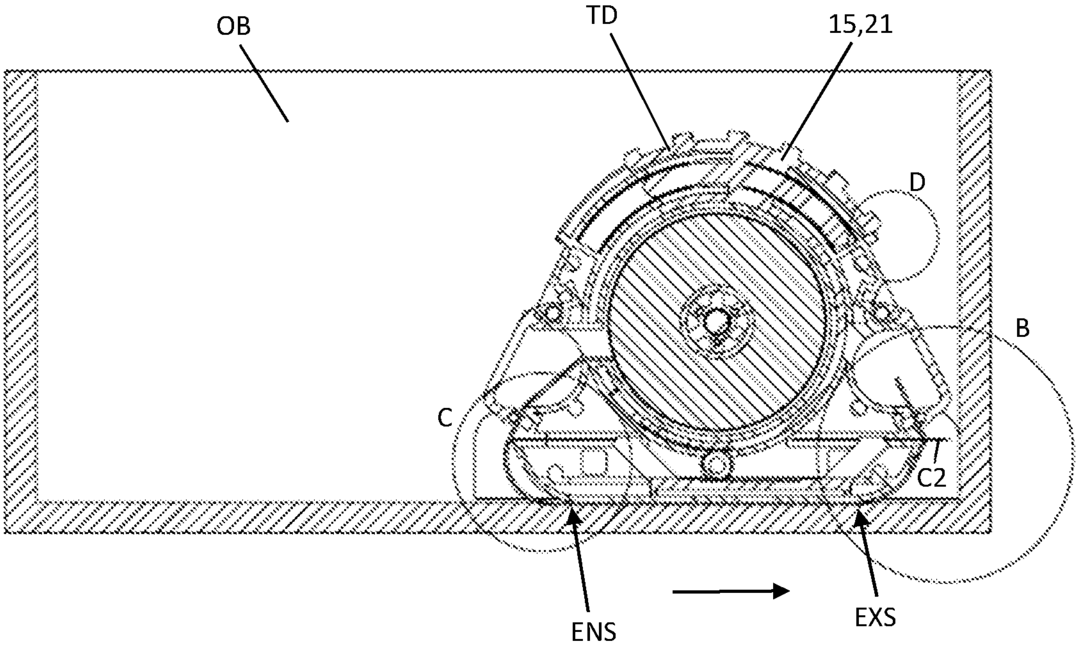
Fig. 13D
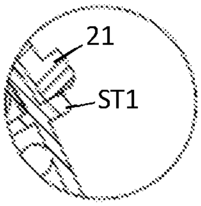
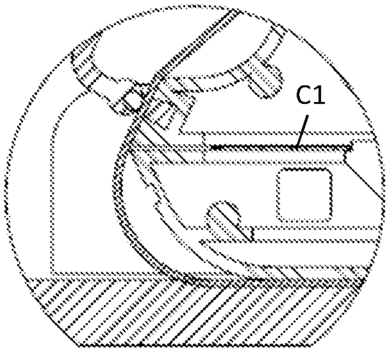
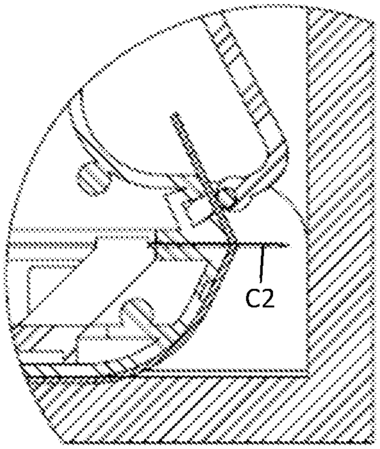
Fig. 13C
Fig. 13B

Fig. 15A
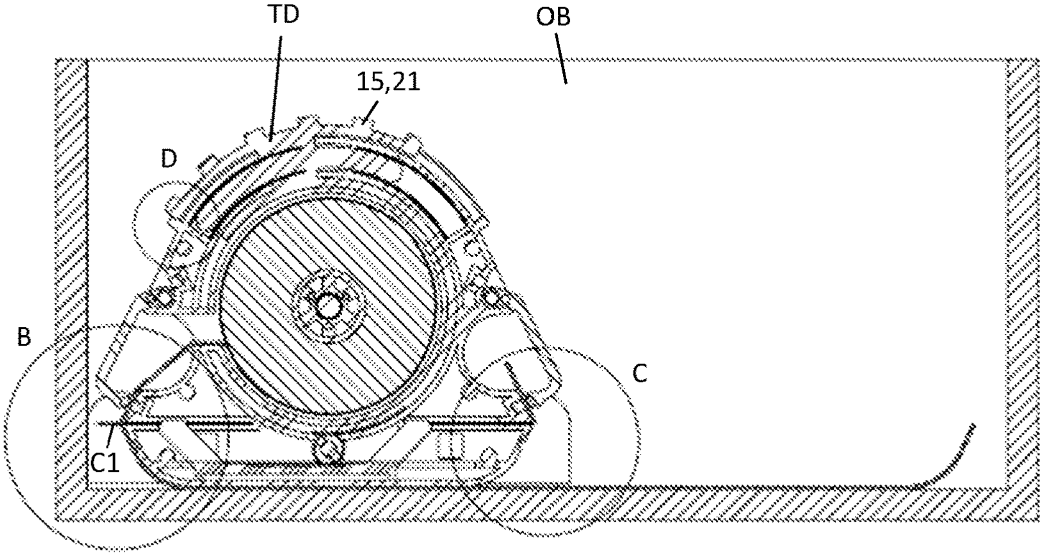
Fig. 15D
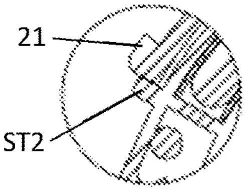
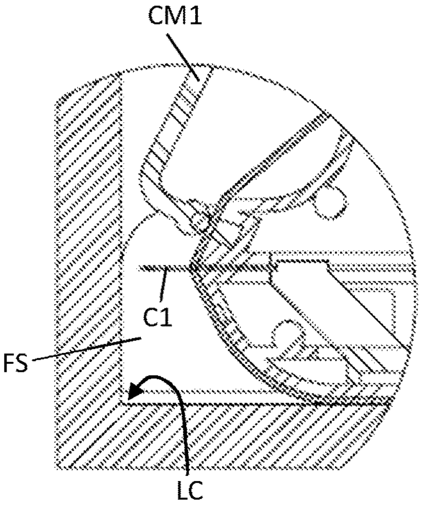
Fig. 15B
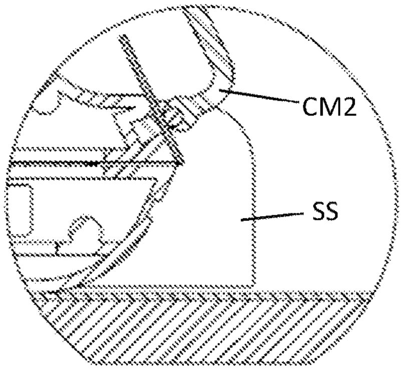
Fig. 15C

FIG. 28A
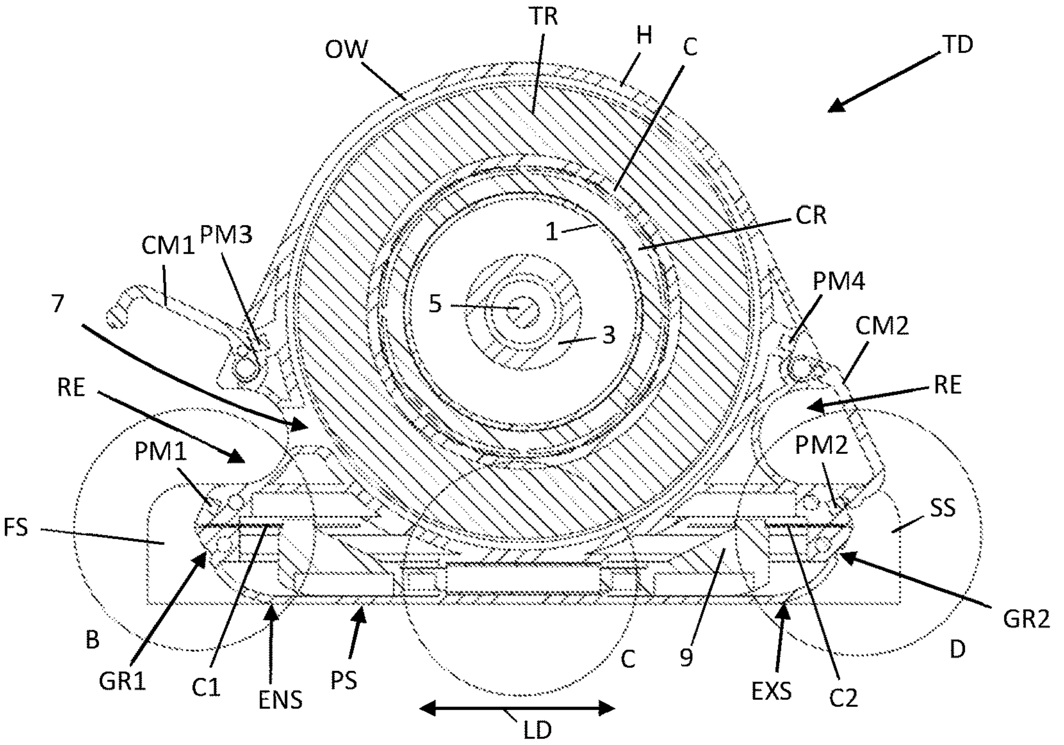
FIG. 28B
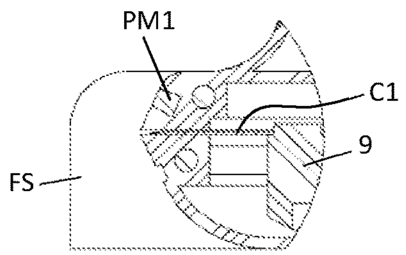
FIG. 28D
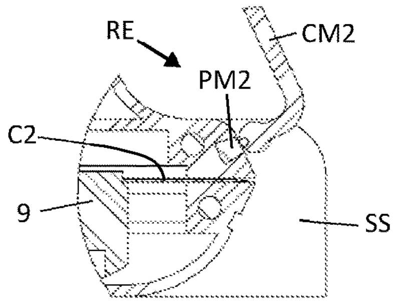
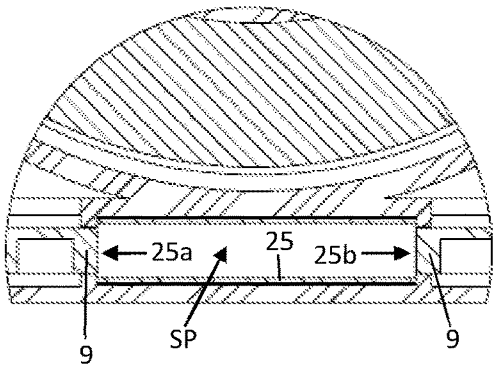
FIG. 28C

TAPE DISPENSER, A TAPE DISPENSER KIT, A ROLL OF MASKING TAPE AND A TAPE DISPENSER OPERATING METHOD

BACKGROUND OF THE INVENTION

The invention relates to a tape dispenser for applying masking tape for painting or sealing to an object. The invention further relates to a tape dispenser kit allowing different uses of the tape dispenser and in combination a tape dispenser and a roll of masking tape. The invention also relates to a roll of masking tape and an operating method for a tape dispenser according to the invention.

A prior art example of a tape dispenser for applying masking tape for painting to an object can be found in international patent publication WO2009/021940A2. The prior art tape dispenser comprises tape guiding surfaces in the form of rollers and in between the tape guiding surfaces a cutter for cutting the tape.

An important aspect of a tape dispenser for applying masking tape for painting is how tape is applied in corners of an object. In WO2009/021940A2, a rather complex method of operation is disclosed in which one of the sides of the tape dispenser has to engage with adjacent surfaces of the object in order to keep the tape dispenser in an orientation in which the masking tape is cut to a length using the cutter that corresponds to a distance to the corner of the object. Another disadvantage of the disclosed tape dispenser is that applying a length of tape always has to start in the same one of the two corners associated with the length of tape and cannot start in the other corner.

A further disadvantage of the prior art tape dispensers may be that the tape dispenser is sensitive to small hand movements during the handling of the tape dispenser due to the relatively small tape guiding surfaces. Further, the forces required to push the tape dispenser against the surface to which the tape needs to be applied, to push the tape dispenser against a reference surface, and to move the tape dispenser along the surface to which the tape needs to be applied all have to be applied using the wrist of a hand. However, when the handle of the tape dispenser is at a relatively large distance from the tape guiding surfaces or pressure surfaces, positioning may not be that accurate or the tape dispenser needs to be handled or manipulated using both hands.

BRIEF SUMMARY OF THE INVENTION

In view of the above it is an object of the invention to provide an improved tap dispenser, in particular a tape dispenser which makes applying masking tape in corners easy.

According to a first aspect of the invention, there is provided a tape dispenser for applying masking tape for painting to an object, comprising:

- a housing for accommodating a roll of masking tape, said roll of masking tape having a width and carrying a certain length of masking tape; and
- a pressure surface for applying pressure to the object while a masking tape portion is present in between the pressure surface and the object, said pressure surface having a length and a width, and said pressure surface having an entry side and an exit side, wherein the housing and pressure surface are configured to guide masking tape from the roll of masking tape via the entry side of the pressure surface along the pressure surface towards the exit side of the pressure surface in a longitudinal direction of the pressure surface, and wherein the tape dispenser further comprises:

- a first cutter for cutting masking tape between the roll of masking tape and the entry side of the pressure surface seen in longitudinal direction; and
- a second cutter for cutting masking tape downstream of the exit side of the pressure surface.

In an embodiment, the pressure surface has a length that is at least two times larger than a width of the pressure surface, preferably at least three times larger, more preferably at least four times larger, and most preferably at least five times larger. The larger the area of the pressure surface the easier the tape dispenser can be guided and the less sensitive the tape dispenser is to small hand movements.

Another advantage of using the pressure surface and a cutting possibility on each side of the pressure surface is that the tape dispenser is fully self-supporting, meaning that it can be applied to any surface, can be cut to the desired length for one corner, moved to the other corner and be cut there at the desired length as well without having to manipulate the tape by hand, without having to apply the tape to sensitive areas such as a layer of paint that recently has been applied to an adjacent surface and without having to start in one particular corner.

In an embodiment, the housing has a substantially symmetrical design about a center plane of the tape dispenser, and wherein the housing is configured such that when a roll of masking tape is accommodated inside the housing, a center plane of the roll of masking tape substantially coincides with the center plane of the tape dispenser.

In an embodiment, the housing comprises a first spacer arranged at the entry side of the pressure surface and a second spacer arranged at the exit side of the pressure surface, wherein the first spacer defines a first distance between a free end of the first spacer and the entry side of the pressure surface, wherein the second spacer defines a second distance between a free end of the second spacer and the exit side of the pressure surface, and wherein preferably the first distance is equal to the second distance.

In an embodiment, a length of masking tape extending in use between the entry side of the pressure surface and the first cutter is equal to the first distance minus half a difference between a width of the housing and a maximum width of the masking tape that can be accommodated inside the housing, and wherein a length of masking tape extending in use between the exit side of the pressure surface and the second cutter is equal to the second distance minus half said difference.

In an embodiment, the tape dispenser further comprising an actuation system to selectively operate the first cutter and the second cutter.

In an embodiment, the actuation system comprises a sliding element to be engaged by user's hand, preferably a palm of a user's hand or one or more fingers or thumb, wherein the housing is configured to guide the sliding element in a longitudinal direction of the housing, and wherein the actuation system is configured such that moving the sliding element in a direction towards the entry side of the pressure surface causes a cutting action of the first cutter and such that moving the sliding element in a direction towards the exit side of the pressure surface causes a cutting action of the second cutter.

In an embodiment, the tape dispenser further comprises a first clamping mechanism for clamping the masking tape to a housing part at a location upstream of the first cutter.

In an embodiment, the tape dispenser further comprises a second clamping mechanism for clamping the masking tape to a housing part at a location downstream of the second cutter.

According to a second aspect of the invention, there is provided a tape dispenser kit comprising a tape dispenser for applying masking tape for painting to an object, said tape dispenser comprising:

a housing for accommodating a roll of masking tape, said roll of masking tape having a width and carrying a certain length of masking tape; and a pressure surface for applying pressure to the object while a masking tape portion is present in between the pressure surface and the object, said pressure surface having a length and a width, and said pressure surface having an entry side and an exit side, wherein the housing and pressure surface are configured to guide masking tape from the roll of masking tape via the entry side of the pressure surface along the pressure surface towards the exit side of the pressure surface in a longitudinal direction of the pressure surface, wherein the housing has a substantially symmetrical design about a center plane of the tape dispenser, and wherein the housing is configured such that when a roll of masking tape is accommodated inside the housing, a center plane of the roll of masking tape substantially coincides with the center plane of the tape dispenser, and wherein the tape dispenser further comprises:

a first cutter for cutting masking tape between the roll of masking tape and the entry side of the pressure surface seen in longitudinal direction; and a second cutter for cutting masking tape downstream of the exit side of the pressure surface, and wherein the tape dispenser kit further comprises one or more attachments or replacements to set a width of the housing at one or more predetermined values.

In an embodiment, the housing preferably comprises a first spacer arranged at the entry side of the pressure surface and a second spacer arranged at the exit side of the pressure surface, wherein preferably the first spacer defines a first distance between a free end of the first spacer and the entry side of the pressure surface, wherein preferably the second spacer defines a second distance between a free end of the second spacer and the exit side of the pressure surface, wherein preferably a length of masking tape extending in use between the entry side of the pressure surface and the first cutter is equal to the first distance minus half a difference between a width of the housing and a maximum width of the masking tape that can be accommodated inside the housing, wherein preferably a length of masking tape extending in use between the exit side of the pressure surface and the second cutter is equal to the second distance minus half said difference, and wherein preferably the one or more attachments or replacements are configured to adjust the length of masking tape extending in use between the entry side of the pressure surface and the first cutter and the length of masking tape extending in use between the exit side of the pressure surface and the second cutter. In an embodiment, the one or more attachments or replacements are not configured to set a width of the housing at one or more predetermined values, but only to adjust the length of masking tape extending in use between the entry side of the pressure surface and the first cutter and the length of masking tape extending in use between the exit side of the pressure surface and the second cutter.

In an embodiment, one or more of the attachments include a guiding plate extending in a direction substantially perpendicular to the pressure surface for engagement with a surface that is substantially perpendicular to a surface to be engaged by the pressure surface to apply masking tape along an edge between said surfaces.

According to a third aspect of the invention, there is provided a tape dispenser kit comprising a tape dispenser for applying masking tape for painting to an object, said tape dispenser comprising:

a housing for accommodating a roll of masking tape, said roll of masking tape having a width and carrying a certain length of masking tape; and a pressure surface for applying pressure to the object while a masking tape portion is present in between the pressure surface and the object, said pressure surface having a length and a width, and said pressure surface having an entry side and an exit side, wherein the housing and pressure surface are configured to guide masking tape from the roll of masking tape via the entry side of the pressure surface along the pressure surface towards the exit side of the pressure surface in a longitudinal direction of the pressure surface, and wherein the tape dispenser further comprises:

a first cutter for cutting masking tape between the roll of masking tape and the entry side of the pressure surface seen in longitudinal direction; and a second cutter for cutting masking tape downstream of the exit side of the pressure surface, and wherein the tape dispenser kit further comprises a roll of masking tape to be accommodated inside the tap dispenser.

In an embodiment, a width of the roll of masking tape is substantially equal to a width of a space inside the housing where the roll of tape will be accommodated According to a fourth aspect of the invention, there is provided a roll of masking tape suitable for a tape dispenser according to the invention, comprising:

a length of masking tape wound as a roll;

a guiding sheet per side surface of the roll of masking tape, wherein the guiding sheets are arranged such that they rotate along with the roll of masking tape when used in a tape dispenser, and wherein an external surface of the guiding sheets extending away from the masking tape is configured to slide relative to a side wall of a housing of the tape dispenser.

In an embodiment, the roll of masking tape further includes a core, wherein the length of masking tape is wound on the core, i.e. around the core, and wherein preferably each guiding sheet at least covers masking tape at the respective side surfaces of the roll of masking tape. In an embodiment, each guiding sheet covers at least 25% of the masking tape at the respective side surface of the roll of masking tape, preferably at least 50%, more preferably at least 75%, and most preferably 100%.

According to a fifth aspect of the invention, there is provided an operating method for a tape dispenser for applying masking tape for painting to an object, said tape dispenser comprising:

a housing for accommodating a roll of masking tape, said roll of masking tape having a width and carrying a certain length of masking tape; and a pressure surface for applying pressure to the object while a masking tape portion is present in between the pressure surface and the object, said pressure surface having a length and a width, and said pressure surface having an entry side and an exit side, wherein the housing and pressure surface are configured to guide masking tape from the roll of masking tape via the entry side of the pressure surface along the pressure surface towards the exit side of the pressure surface in a longitudinal direction of the pressure surface, and wherein the tape dispenser further comprises:

a first cutter for cutting masking tape between the roll of masking tape and the entry side of the pressure surface seen in longitudinal direction; and a second cutter for cutting masking tape downstream of the exit side of the pressure surface, and wherein the method comprises the following steps:

a) introducing a roll of masking tape inside the housing;

b) unwinding masking tape from the roll to extend from the roll of masking tape via the entry side of the pressure surface along the pressure surface towards the exit side of the pressure surface beyond the second cutter;

c) pressing the masking tape at the pressure surface to an object;

d) cutting masking tape downstream of the exit side of the pressure surface using the second cutter;

e) moving the tape dispenser along the object in a direction from the exit side of the pressure surface towards the entry side of the pressure surface thereby unwinding masking tape from the roll of masking tape and applying masking to the object; and f) cutting masking tape upstream of the entry side of the pressure surface using the first cutter.

In an embodiment, the housing of the tape dispenser comprises a first spacer arranged at the entry side of the pressure surface and a second spacer arranged at the exit side of the pressure surface, wherein the first spacer defines a first distance between a free end of the first spacer and the entry side of the pressure surface, wherein the second spacer defines a second distance between a free end of the second spacer and the exit side of the pressure surface, wherein prior to step d) the tape dispenser is moved in a direction from the entry side of the pressure surface towards the exit side of the pressure surface until the second spacer engages with a portion of the object.

In an embodiment, step e) is carried out until the first spacer engages with a portion of the object.

Although the above aspects of the invention have been described independently from each other, it is noted here that features and embodiments applicable to one aspect of the invention may readily be combined with and applied to other aspects of the invention, when technically plausible.

BRIEF DESCRIPTION OF THE DRAWINGS

The invention will now be described in a non-limiting way with reference to the accompanying drawings in which like parts are indicated by like reference symbols and in which:

FIG. 13A-13D schematically depict a further step in an operating method for the tape dispenser of FIG. 1;

FIG. 15A-15D schematically depict a further step in an operating method for the tape dispenser of FIG. 1;

FIG. 28A-28D schematically depict a cross-sectional view of the tape dispenser of FIG. 26A along a plane parallel to a longitudinal axis of the tape dispenser;

DETAILED DESCRIPTION OF THE INVENTION

Figure 1:
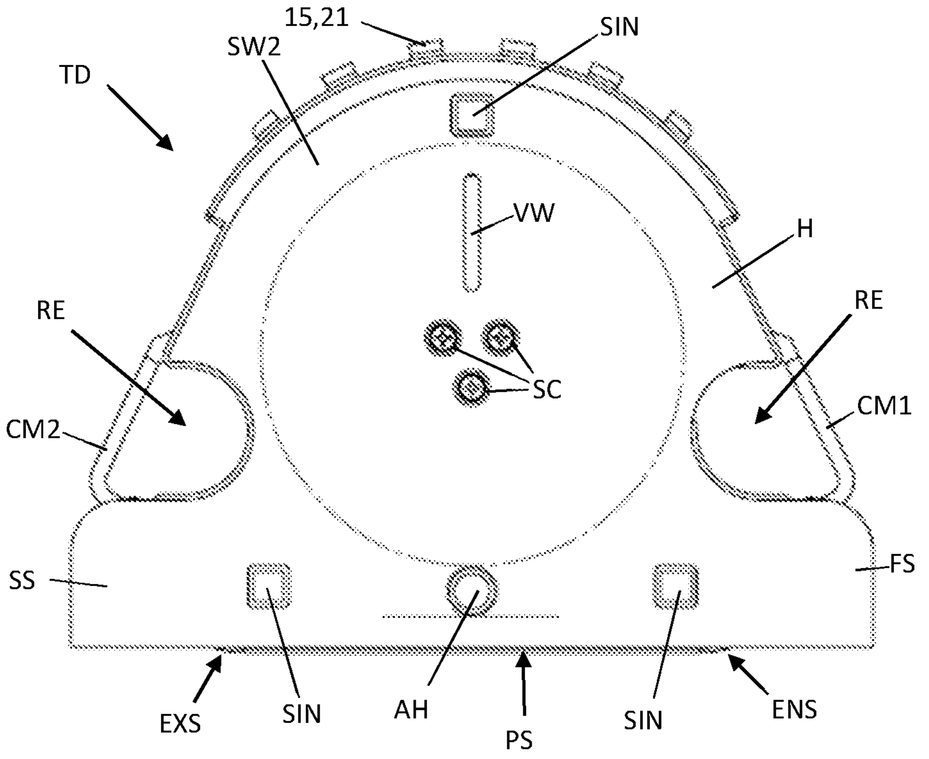
FIG. 1 schematically depicts a side view of a tape dispenser according to an embodiment of the invention.
Figure 2:
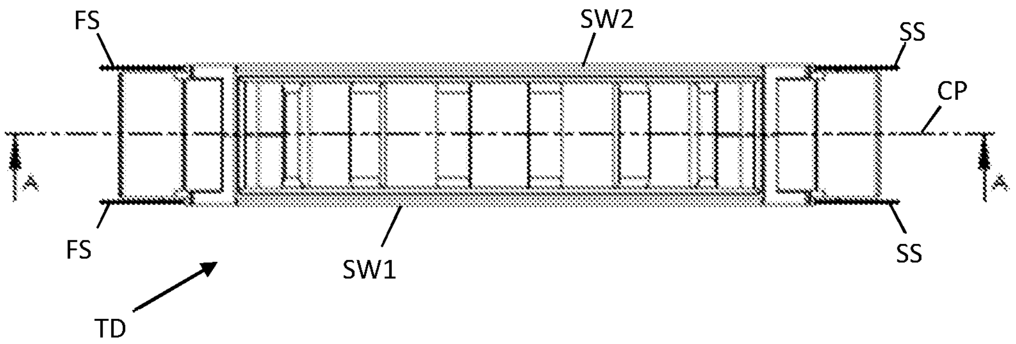
FIG. 2 schematically depicts a top view of the tape dispenser of FIG. 1.
Figure 3:
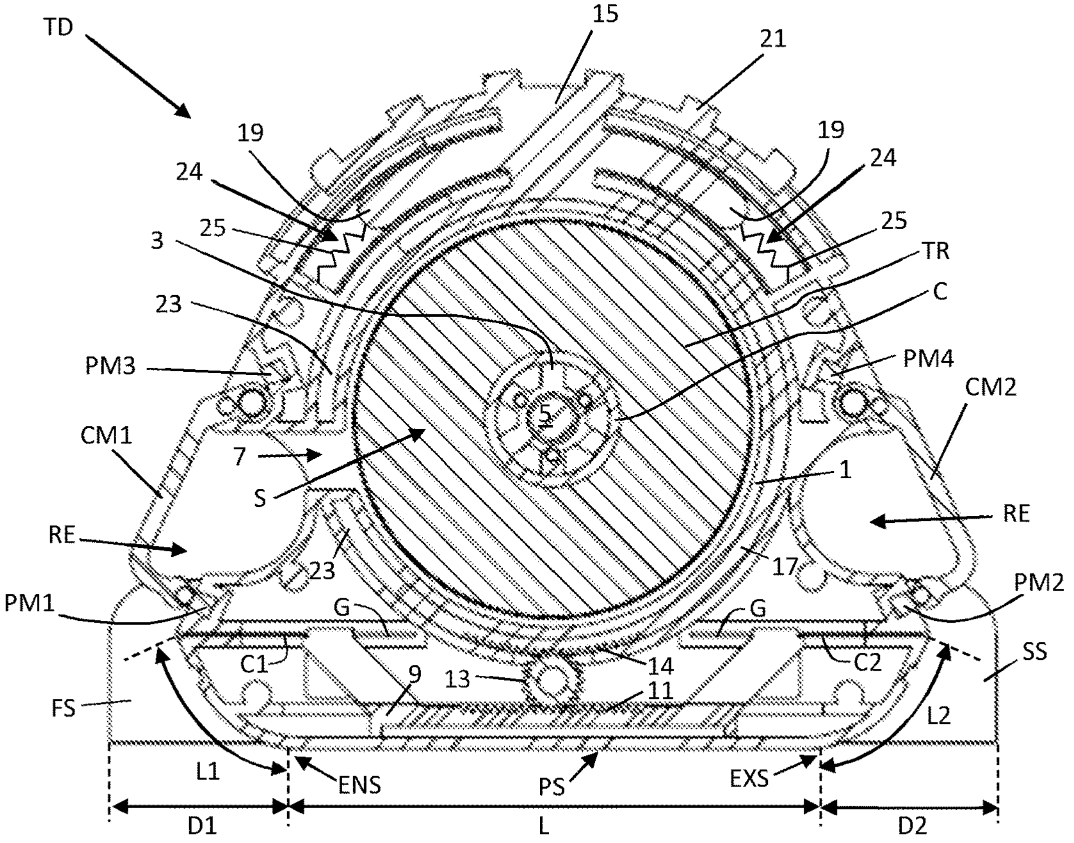
FIG. 3 schematically depicts a cross-sectional view of the tape dispenser of FIG. 1 along line A-A as shown in FIG. 2.
Figure 4:
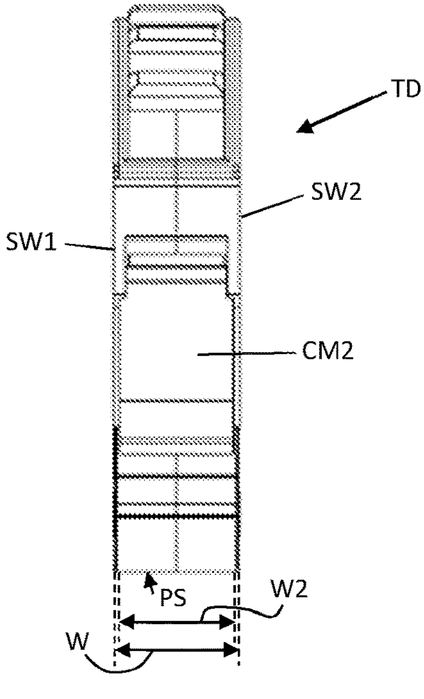
FIG. 4 schematically depicts a front view of the tape dispenser of FIG. 1.
Figure 5A:
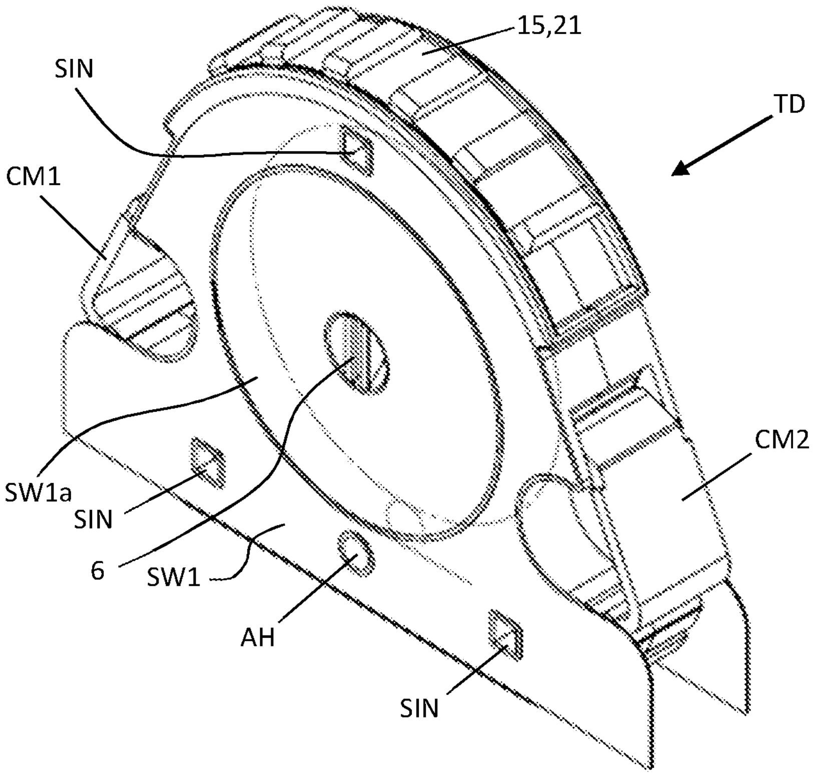
FIG. 5A schematically depicts a perspective view of the tape dispenser of FIG. 1.
Figure 5B:
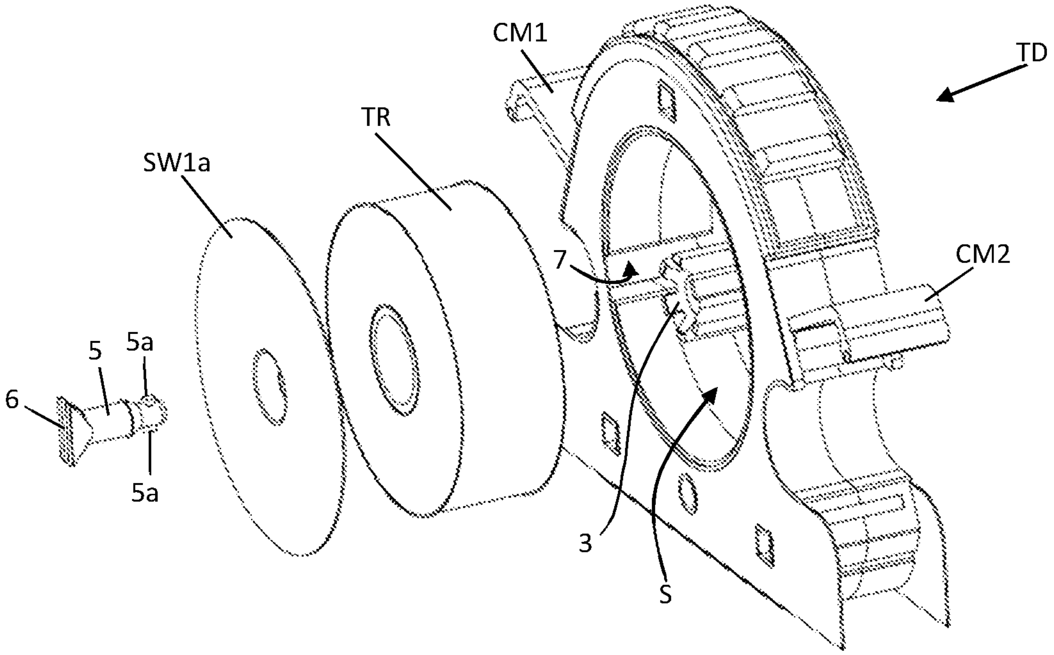
FIG. 5B schematically depicts an exploded view of the tape dispenser of FIG. 1.
Figure 6:
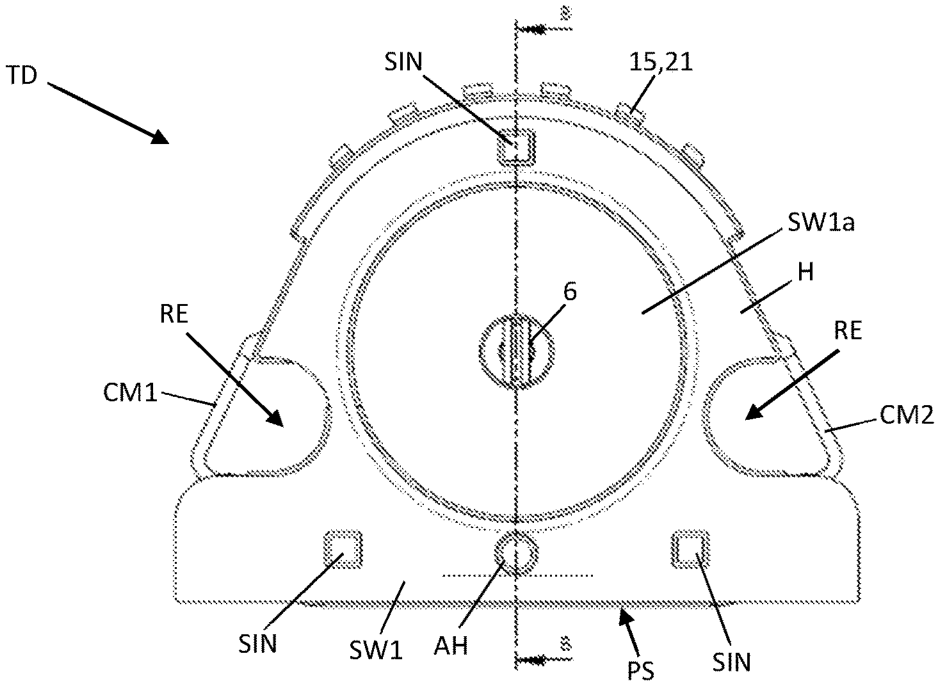
FIG. 6 schematically depicts an opposite side view of the tape dispenser of FIG. 1.
Figure 7:
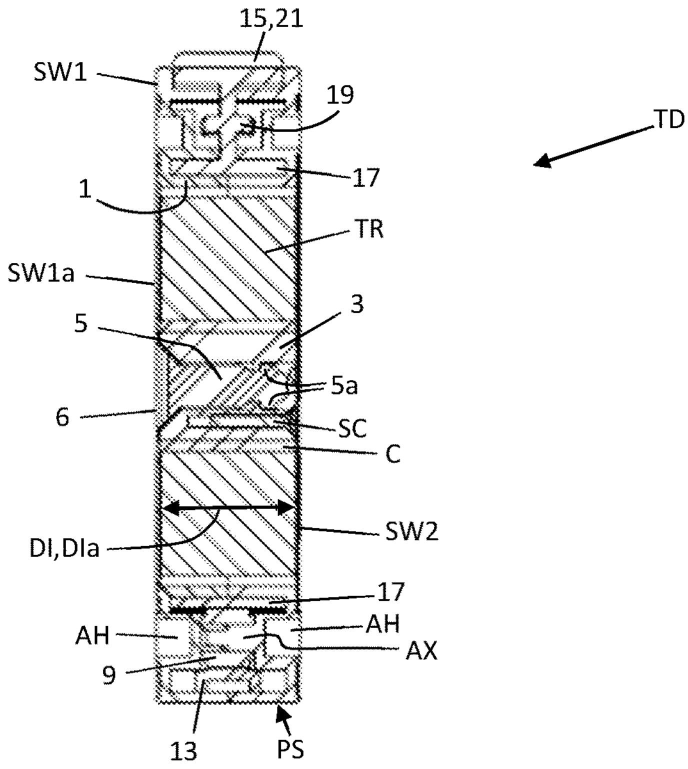
FIG. 7 schematically depicts a cross-sectional view of the tape dispenser of FIG. 1 along line B-B as shown in FIG. 6.

FIGS. 1-7 schematically depict a tape dispenser TD according to an embodiment of the invention. FIG. 1 depicts a side view, FIG. 2 depicts a top view, FIG. 3 depicts a cross-sectional view along line A-A as shown in FIG. 2, FIG. 4 depicts a front view, FIG. 5A depicts a perspective view, FIG. 5B depicts an exploded view, FIG. 6 depicts an opposite side view, and FIG. 7 depicts a cross-sectional view along line B-B as shown in FIG. 6.

The tape dispenser TD according to the invention is especially suitable for applying masking tape for painting or sealing to an object, e.g. a window. A corresponding method for operating the tape dispenser to apply the masking tape will be described later on in more detail by reference to FIGS. 9A-18C.

Figure 8:
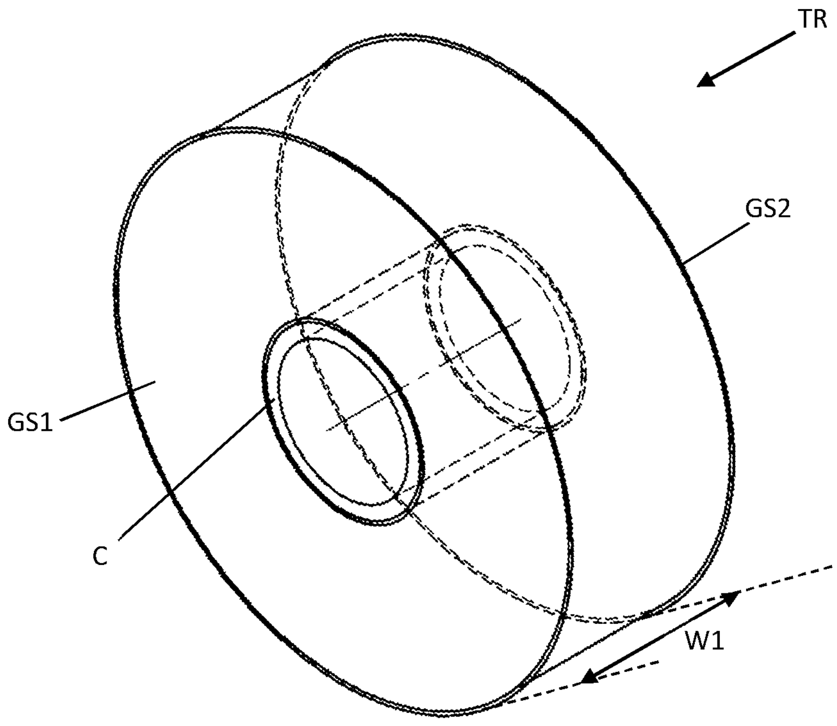
FIG. 8 schematically depicts a perspective view of a roll of masking tape according to an embodiment of the invention.

The tape dispenser TD comprises a housing H with a space S delimited by a wall 1 and side walls SW1, SW2 for accommodating a roll TR of masking tape. An example of a roll TR suitable to be used in combination with the tape dispenser TD is shown in FIG. 8 and will be described below in more detail. For now, it is only necessary to know that the roll TR has a width W1 and carrying a certain length of masking tape.

In a centre of the space S, a member 3 is provided to engage with a core C of the roll TR. The member 3 is configured to allow the core C of the roll TR to rotate about the member 3. In this example, the member 3 is stationary and defines a virtual rotation axis in the centre of the space S. In an alternative embodiment, the member 3 is rotatably arranged to rotate about a rotation axis and thus is configured to rotate along with the core C of the roll TR.

In this embodiment, the member 3 is mounted to the side wall SW2 using three screws SC, but any other mounting provision is envisaged.

The housing H comprises an opening 7 allowing the masking tape to extend from the roll TR through the opening 7 around the housing towards a pressure surface PS at a bottom of the tape dispenser TD.

In use, it is intended that any adhesive layer or sticky side of the masking tape faces away from the tape dispenser TD at the pressure surface PS. The pressure surface can then be used to apply pressure to the object while a masking tape portion is present in between the pressure surface PS and the object thereby applying the masking tape portion to the object.

The pressure surface PS has a length L extending from an entry side ENS to an exit side EXS of the pressure surface PS. The pressure surface PS also has a width W2, which is the dimension of the pressure surface PS in a direction perpendicular to the longitudinal direction.

The housing H and the pressure surface PS are configured to guide masking tape from the roll TR of masking tape via the entry side ENS of the pressure surface PS along the pressure surface PS towards the exit side EXS of the pressure surface PS in a longitudinal direction of the pressure surface PS.

When the pressure surface PS is used to apply pressure to an object while an masking tape portion is present in between the pressure surface PS and the object OB, the masking tape portion will adhere to the object so that moving the tape dispenser TD in a direction from exit side EXS to entry side will automatically unwind the masking tape from the roll TR and apply the masking tape to the object.

The tape dispenser TD further comprises a first cutter C1 to cut masking tape upstream of the entry side ENS of the pressure surface PS, i.e. the first cutter C1 is arranged to engage with a masking tape portion extending in use between the roll TR of masking tape and the entry side ENS of the pressure surface PS.

The tape dispenser TD also comprises a second cutter C2 to cut masking tape downstream of the exit side EXS of the pressure surface PS, i.e. the second cutter C2 is arranged to engage with a masking tape portion extending in use beyond the pressure surface PS.

An advantage of the first and second cutter C1, C2 is that the masking tape can be cut to the desired length at both sides of the tape dispenser TD making this tape dispenser easier to apply masking tape to an object, especially in corners, and making the tape dispenser suitable to allow a user to start in either corner of an object in order to start applying masking tape.

In this embodiment, the first and second cutter C1, C2 are embodied by cutting blades guided by grooves G to be moved in a longitudinal direction of the cutters C1, C2. The first and second cutter C1, C2 each have a rest position as shown in FIG. 3, in which the first and second cutter C1, C2 do not extend beyond the housing H and thus masking tape is able to pass the first and second cutter C1, C2 without engaging with the first and second cutter C1, C2.

The tape dispenser TD comprises an actuation system to selectively operate the first cutter C1 and the second cutter C2, meaning that either the first cutter C1 performs a cutting action or the second cutter C2 performs a cutting action. It is preferred that the first and second cutter are not able to simultaneously perform a cutting action as this allows to apply a variety of different lengths of masking tape to the object.

The actuation system comprises a slider 9 provided with teeth 11 to cooperate with a gear 13. The slider 9 with teeth 11 and the gear 13 function similarly to a rack and pinion. The first and second cutter C1, C2 are connected to the slider 9. Clockwise rotation of the gear 13 as shown in FIG. 3 will move the first cutter C1 from the rest position to a cutting position in which the first cutter C1 extends beyond the housing H to engage with masking tape. Counter-clockwise rotation of the gear 13 as shown in FIG. 3 will move the second cutter C2 from the rest position to a cutting position in which the second cutter C2 extends beyond the housing H to engage with masking tape. Due to the fact that both the first cutter C1 and the second cutter C2 are connected to the slider 9 and move simultaneously, the first cutter C1 is moved to a retracted position when the second cutter C2 is moved to the cutting position and likewise the second cutter C2 is moved to a retracted position when the first cutter C1 is moved to the cutting position.

The gear 13 is rotated by means of an operating member 15, which operating member 15 comprises a gear element 17, a spring element 19 and a sliding element 21. The gear element 17 is received in a circularly shaped space 23 surrounding the space S. In this embodiment, the space 23 is concentric to the space S and the wall 1, so that the space 23 defines a circular moving path for the gear element 17 with a centre coinciding with the rotation axis as defined by the member 3. The gear element 17 comprises teeth 14 to cooperate with the gear 13.

The gear element 17 is connected to the spring element 19 which in turn is connected to the sliding element 21. The sliding element 21 can be operated by the hand of a user, e.g. using the palm of the hand while holding the tape dispenser TD. The housing H is configured to guide movement of the operating member 15 and thus also the sliding element in a longitudinal direction of the housing H. The configuration of the actuation system is in this embodiment such that moving the sliding element in a direction towards the entry side ENS of the pressure surface, i.e. to the left in FIG. 3, causes a cutting action of the first cutter C1 and such that moving the sliding element in a direction towards the exit side EXS of the pressure surface PS, i.e. to the right in FIG. 3, causes a cutting action of the second cutter C2, where cutting action means that the corresponding cutter is moved to the cutting position.

The spring element 19 is moveably arranged in a space 24. Arranged inside space 24 on both sides of the spring element 19 are springs 25 urging the spring element 19 and thus the operating member 15 to a position corresponding to the rest position of the first and second cutter C1, C2. Sliding the sliding element 21 to the left and right can be done by exerting a force to the sliding element that overcomes the forces applied to the spring element 19 by the springs 25. Subsequently releasing the sliding element 21 will then automatically move the operating member 15 to the rest position.

The tape dispenser TD further comprises a first clamping mechanism for clamping the masking tape to a housing part at a location upstream of the first cutter C1, In this embodiment, the first clamping mechanism comprises a permanent magnet PM1 arranged on the housing H and cooperating with a clamping member CM1. The clamping member CM1 is made from or comprises magnetic material, so that the magnet PM1 is able to exert a clamping force to the clamping member CM1.

The tape dispenser TD in this embodiment also comprises a second clamping mechanism for clamping the masking tape to a housing part at a location downstream of the second cutter C2. In this embodiment, the second clamping mechanism comprises a permanent magnet PM2 arranged on the housing H and cooperating with a clamping member CM2. The clamping member CM2 is made from or comprises magnetic material, so that the magnet PM2 is able to exert a clamping force to the clamping member CM2.

In this particular embodiment, each clamping mechanism has an associated recess RE in the housing H. This allows to open a clamping mechanism, to draw a portion of masking tape from the roll TR, insert a finger in the recess RE to hold the masking tape, and close the clamping mechanism without interfering with the finger in the recess RE. As a result thereof, it is possible to reliably position a masking tape portion on the pressure surface PS.

The first and second clamping mechanism ensure that the masking tape is held in place while performing cutting actions with the first cutter C1 or the second cutter C2, preferably by keeping the masking tape tight.

In this embodiment, the housing is provided with a third permanent magnet PM3 and a fourth permanent magnet PM4. The third permanent magnet PM3 is provided to exert a holding force to the first clamping member CM1 when the first clamping member has been moved to an open position. The fourth permanent magnet PM4 is provided to exert a holding force to the second clamping member CM2 when the second clamping member has been moved to an open position. The third and fourth permanent magnet PM3, PM4 thus are advantageous to keep the first and second clamping member in their respective open positions as clearly indicated in FIG. 5B, thereby keeping the hand/fingers of the hand available to perform other actions.

As can be best seen in FIG. 2, the housing H and thus the tape dispenser TD have a substantially symmetrical design about a centre plane CP of the tape dispenser TD, wherein the housing H is configured such that when a roll of masking tape is accommodated inside the housing H having a with W1 that is substantially identical to width W2, a centre plane of the roll of masking tape substantially coincides with the centre plane of the tape dispenser TD. As a result, the sideways distance between masking tape and side of the tape dispenser is substantially identical to each other on both sides and defined by the thickness of the sidewalls SW1, SW2. It thus does not make a difference which sidewall SW1 or SW2 is facing a corresponding sidewall of the object, because the masking tape will be applied at the same distance from the sidewall of the object upon engagement between the sidewall of the object and the respective sidewall SW1, SW2 of the tape dispenser TD.

To cut the masking tape to a desired length, the tape dispenser TD is provided with a first spacer, in this case two first spacers FS, arranged at the entry side ENS of the tape dispenser, and a second spacer, in this case two second spacers SS, arranged at the exit side EXS of the tape dispenser.

The first spacers FS define a first distance D1 between a free end of the first spacers FS and the entry side ENS of the pressure surface PS, and the second spacers SS define a second distance D2 between a free end of the second spacers SS and the exit side EXS of the pressure surface PS. Preferably, the first distance D1 is equal to the second distance D2. The first distance D1 and the second distance D2 are measured in a direction parallel to a longitudinal direction of the pressure surface PS.

A length of masking tape extending in use between the entry side ENS of the pressure surface PS and the first cutter C1 is denoted L1 and a length of masking tape extending in use between the exit side EXS of the pressure surface PS and the second cutter C2 is denoted L2. The width of the housing is denoted W and the maximum width of masking tape roll that can be accommodated inside the housing is denoted W2.

In an embodiment, L1=D1−0.5(W−W2) and L2=D2−0.5 (W−W2). Or in other words, the length L1 is equal to the first distance D1 minus half a difference between a width W of the housing and a maximum width W2 of the masking tape that can be accommodated inside the housing, and the length L2 is equal to the second distance D2 minus half a difference between a width W of the housing and a maximum width W2 of the masking tape that can be accommodated inside the housing H.

An advantage of an embodiment in which L1=D1−0.5 (W−W2) and L2=D2−0.5(W−W2) is that when applying masking tape in a corner, the distance between longitudinal sides of the masking tape to an adjacent wall and a distance between the free end of the masking tape and an adjacent wall are all the same. A further advantage is that when tape is applied in the same corner but perpendicular to already applied tape in said corner, the free end of the to be applied tape can be positioned at one of the longitudinal sides of the already applied tape and one of the longitudinal sides of the to be applied tape can be positioned at the free end of the already applied tape, thereby obtaining full overlap in the corner which is quite difficult to obtain by hand.

As can be best seen in FIG. 5A and FIG. 5B, the side wall SW1 of the housing H comprises a portion SW1*a* that is releasably mounted to the housing H using a connecting element 6. The connecting element 6 may for instance connect the portion SW1*a* to the member 3 using a bayonet mount in which the connecting element comprises a shaft 5 with cams 5*a* that catch behind respective shoulders of the member 3 upon sufficient rotation of the connecting element 6 while a reverse rotation releases the mount. Shaft 5 is also visible in FIG. 3.

By removing the side wall portion SW1*a*, access is gained to the space S allowing to insert a roll TR of tape and for instance to remove the core C of an empty roll TR of tape. To see how much tape is still present on the core C of the roll TR of tape, a viewing window VW is provided in side wall SW2.

To be able to apply masking tape using the tape dispenser TD according to the invention in a reliable manner, the width W1 of the roll TR of tape is close to or substantially identical to a distance D1 between the sidewalls SW1 and SW2 at the space S, which may be equal to the width W2 of the pressure surface PS as in this embodiment. Preferably, the following equation applies: DI=W1+ΔTol, where ΔTol is a tolerance factor. ΔTol is preferably in a range between 0.1 and 0.5 mm, more preferably in a range between 0.1 and 0.3 mm and most preferably 0.1 mm. The above assumes that a distance DI between the sidewalls SW1 and SW2 is equal to the distance DIa between sidewall portion SW1*a* and sidewall SW2. However, it is also envisaged that distance DIa is non-equal to distance DI. Preferably, a thickness of the sidewall portion SW1*a* is equal to the thickness of the sidewall SW1.

An advantage when equation DI=W1+ΔTol or DIa=W1+ΔTol applies is that when the roll of tape is inserted in the space S and the space S is closed by sidewall portion SW1*a*, any sideways deviation in the roll of tape at the time of inserting the roll of tape in the space S, e.g. due to the viscous nature of the glue between the masking tape portions causing misalignment between masking tape portions in the width direction will be substantially reduced, preferably minimized.

FIG. 8 schematically depicts a roll TR of masking tape suitable for a tape dispenser TD according to the FIGS. 1-7. The roll TR of masking tape comprises a core C, a length of masking tape wound on the core C, and a guiding sheet GS1, GS2 per side surface of the roll TR of masking tape covering at least partially the masking tape wound on the core C.

The guiding sheets GS1, GS2 are arranged such that they rotate along with the roll TR of masking tape, for example by connecting the guiding sheets GS1, GS2 to the core C and/or by connecting the guiding sheets GS1, GS2 to the respective side surfaces of the roll TR of masking tape, i.e. to the side surfaces of the masking tape itself. The guiding sheets GS1, GS2 may for instance be adhered to the side surfaces of the masking tape, e.g. using the same adhesive as the adhesive layer or sticky side of the masking tape used to adhere the masking tape to a surface of an object when applying the masking tape.

The guiding sheets GS1, GS2 are further configured such that a surface of the guiding sheets GS1, GS2 facing away from the masking tape is configured to slide relative to a slide wall of a housing of the tape dispenser. The coefficient of static friction of the guiding sheets GS1, GS2 at the surface facing away from the masking tape may be below 0.6, preferably below 0.3, more preferably below 0.2, and most preferably below 0.1.

The thickness of the guiding sheets GS1, GS2 is preferably as low as possible so that masking tape can be as wide as possible. The thickness of the guiding sheets GS1, GS2 may for instance be below 0.35 mm, preferably below 0.25 mm, more preferably below 0.15 mm, even more preferably below 0.1 mm, and most preferably below 0.05 mm.

In an embodiment, the guiding sheets are made of or comprise paper.

In an embodiment, the guiding sheets are made of or comprise polyethylene terephthalate (PET) or polyethylene (PE). The guiding sheets GS1, GS2 may also comprise a base sheet to which a low-friction coating is provided on the surface facing away from the masking tape. The low-friction coating may for instance comprise polytetrafluoroethylene (PTFE or Teflon).

Although the roll TR of masking tape has been described including core C, it is also possible that no core C is provided and the roll only comprises a length of masking tape wound as a roll and a guiding sheet per side surface of the roll of masking tape.

It is noted explicitly here that the width W1 as depicted in FIG. 8 indicates the width of the roll of tape including the guiding sheets GS1 and GS2. When the width W1 is used in other parts of the description, the width W1 may also refer to the width of the roll of tape without guiding sheets GS1, GS2, when a roll of tape is used having no guiding sheets. Further, width W1 is determined locally, meaning for instance that when a masking tape portion has drifted sideways relative to an adjacent masking tape portion, e.g. due to the viscous nature of the glue, width W1 is not the total width including sideways movement, but still the width of the local masking tape portion including, if present, the guiding surfaces GS1, GS2.

Figure 9A:
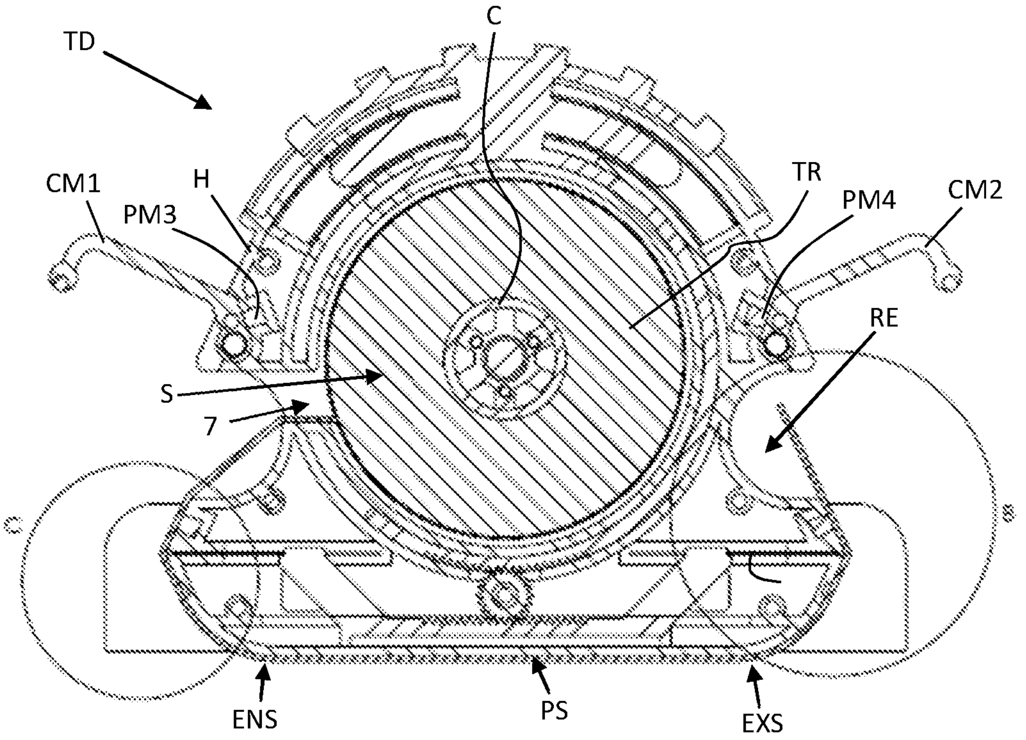
FIG. 9A-9C schematically depict a step in an operating method for the tape dispenser of FIG. 1.

FIG. 9A to 18C describe a method of operating the tape dispenser TD described in relation to the FIGS. 1-7. Prior to the situation as shown in FIG. 9A, a roll TR of masking tape has been introduced into the housing H, in particular into the space S, so that the core C of the roll TR engages with the member 3 to allow rotation of the roll TR about the corresponding rotation axis. The introduction of the roll TR of masking tape into the space S, may comprise one or more of the following steps, cf. FIG. 5B:

a) disconnecting connecting element 6 from the member 3;
b) removing side wall portion SW1*a;*
c) removing any remains of a previously installed roll of masking tape, e.g. core and/or guiding sheets, if present;
d) introducing the roll TR into the space S with the core C arranged around the member 3;
e) closing off the space S by positioning the side wall portion SW1*a* over the space S;
f) connecting the connecting element 6 to the member 3.

In an embodiment, prior to method step d) of introducing the roll TR into the space S, a first length of masking tape is unwound from the roll TR of masking tape, and method step d) is carried out such that this first length of masking tape extends through opening 7 after introducing the roll TR into the space S, so that the first length of masking tape can be used for further unwinding of the masking tape from the roll after closing off the space S. Alternatively, the opening 7 may be large enough to be able to reach the masking tape inside the space S for unwinding purposes. In an embodiment, the first length of masking tape may be folded on itself so that this first length of masking tape can be handled and/or manipulated without contacting the adhesive layer. A further advantage is that by folding the first length of tape on itself, either in longitudinal direction or in transverse direction, the stiffness of the first length of tape is increased. The first length of masking tape can also advantageously be used to unwind the masking tape from the roll until the first length of masking tape extends beyond the second cutter C2, preferably extends beyond the permanent magnet PM2.

It is preferred that a roll TR of masking tape as described in accordance with FIG. 8, hence, including guiding sheets GS1, GS2, is introduced into the space S to avoid any sticking of the masking tape to the inner surfaces of side wall portion SW1*a* and side wall SW2.

Also prior to the situation as shown in FIG. 9A, the clamping members CM1 and CM2 both have been brought into an open position as shown in FIG. 9A. Permanent magnets PM3, PM4 keep the clamping members CM1, CM2 in the open position, respectively.

Subsequently, masking tape has been unwound from the roll TR to extend from the roll of masking tape through the opening 7 via the entry side ENS of the pressure surface PS along the pressure surface PS towards the exit side of the pressure surface PS beyond the second cutter C2, in this case into the recess RE at the second clamping member CM2.

Figure 9C:
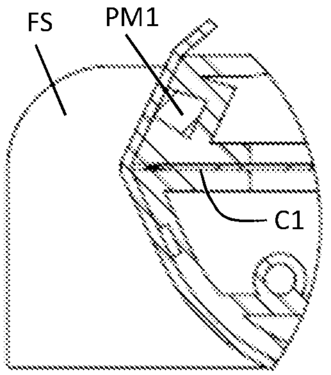
Figure 9B:
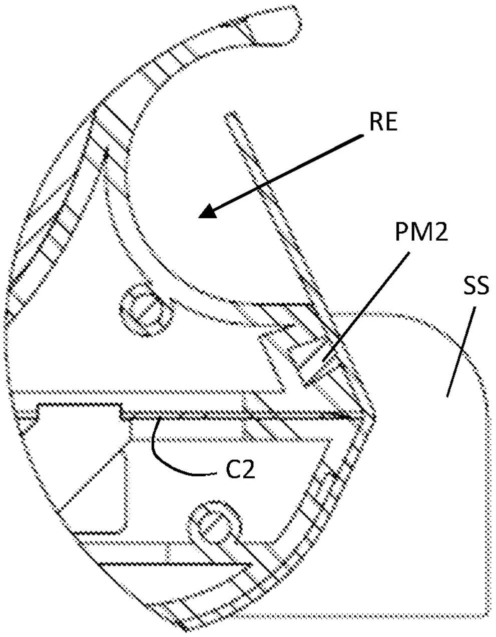

As shown in FIGS. 9B and 9C, the masking tape can be wound tight around the pressure surface PS and housing H also at the locations of the first cutter C1 and the second cutter C2, which are in the rest position and thus do not engage with the masking tape yet. It may be important to introduce the roll TR of tape in the space S such that when the masking tape is unwound from the roll TR, the adhesive layer or sticky side of the masking tape is facing away from the housing H and the pressure surface PS.

Figure 10A:
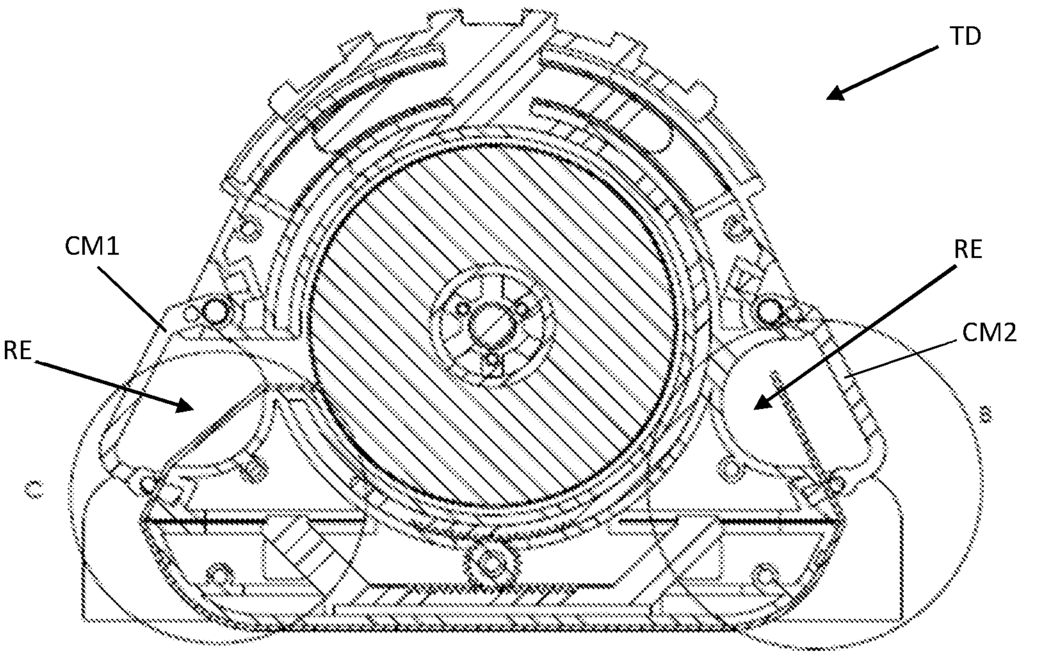
FIG. 10A-10C schematically depict a further step in an operating method for the tape dispenser of FIG. 1.
Figure 10C:
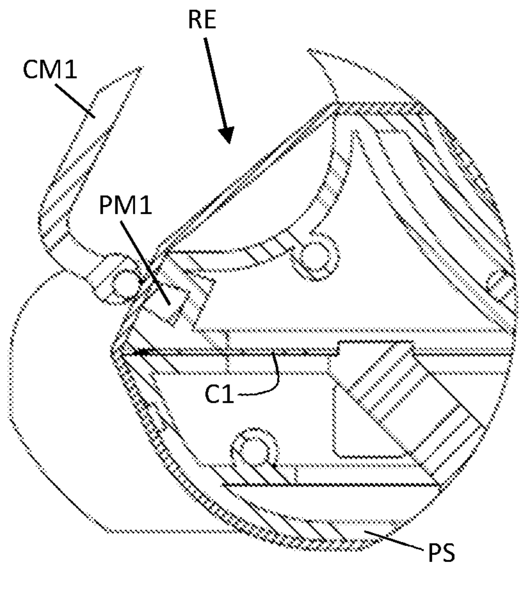
Figure 10B:
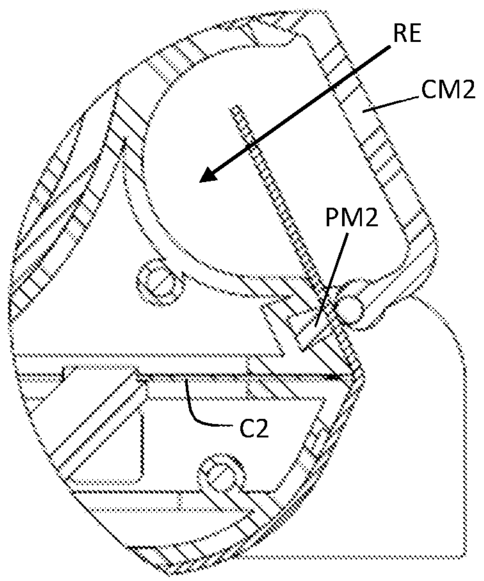

FIGS. 9B and 9C also show that the masking tape is unwound from the roll to extend adjacent the permanent magnets PM1 and PM2 as this allows to close the clamping members CM1 and CM2 to clamp the masking tape between the respective clamping member CM1, CM2 and the respective permanent magnet PM1, PM2 as shown in the FIGS. 10A-10C. The clamping members CM1, CM2 and the recesses RE in the housing H are preferably such that the masking tape can be held by or manipulated by a finger of a user while closing the clamping members CM1, CM2 as this helps in keeping the masking tape tight around the pressure surface PS and in the region of the first and second cutter C1, C2.

Figure 11A:
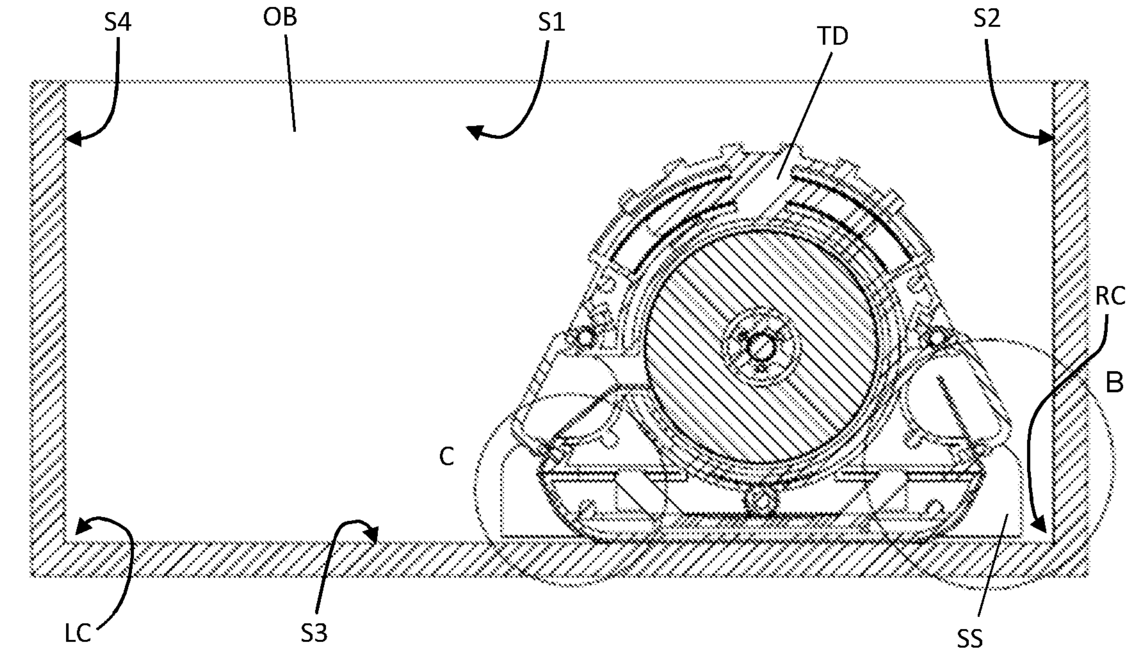
FIG. 11A-11C schematically depict a further step in an operating method for the tape dispenser of FIG. 1.
Figure 11C:
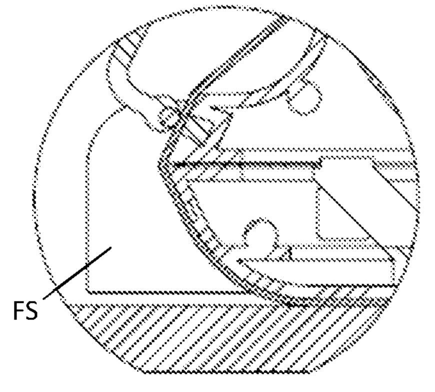

FIG. 11A shows an object OB having four surfaces S1-S4 arranged at right angles to each other and defining a left corner LC and a right corner RC. The description below relates to applying masking tape to the third surface S3 of the object OB. FIGS. 11A-110 relate to a first step of this method after having gone through all preparatory steps as described above.

In this first step, the masking tape present at the pressure surface PS of the tape dispenser TD is pressed against the third surface S3 of the object OB with the second spacers SS facing towards and close to the right corner RC in this embodiment. The tape dispenser TD is preferably positioned such that the side wall SW2 of the tape dispenser TD is in engagement with the first surface S1 of the object OB.

It would also have been possible to start at or near the left corner LC by positioning the tape dispenser such that the second spacers SS face towards and are close to the left corner LC and the side wall SW1 of the tape dispenser TD in engagement with the first surface S1 of the object OB.

Figure 11B:
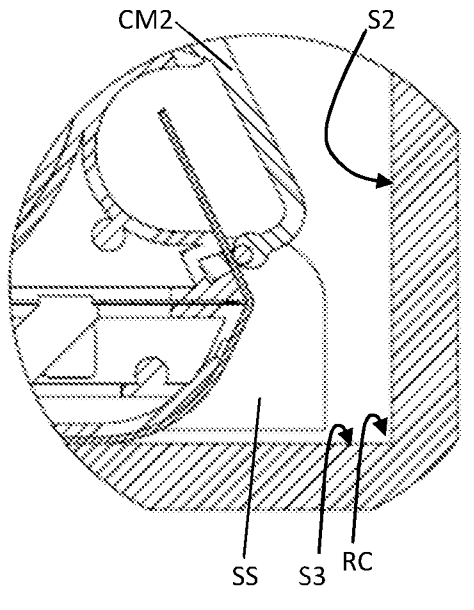
Figure 12A:
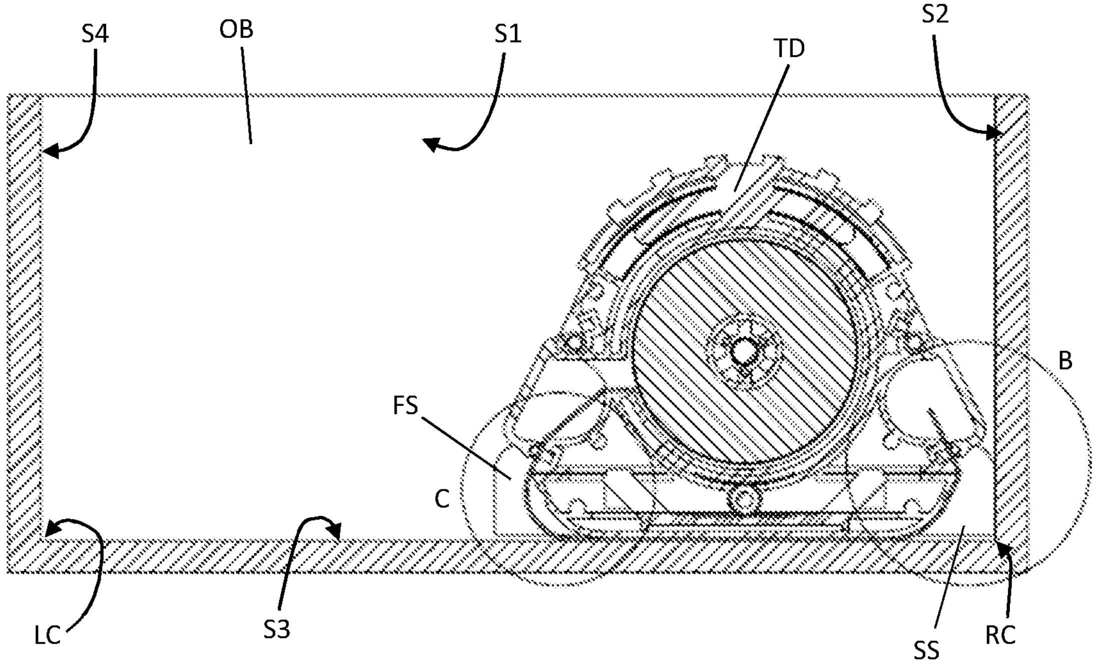
FIG. 12A-12C schematically depict a further step in an operating method for the tape dispenser of FIG. 1.
Figure 12C:
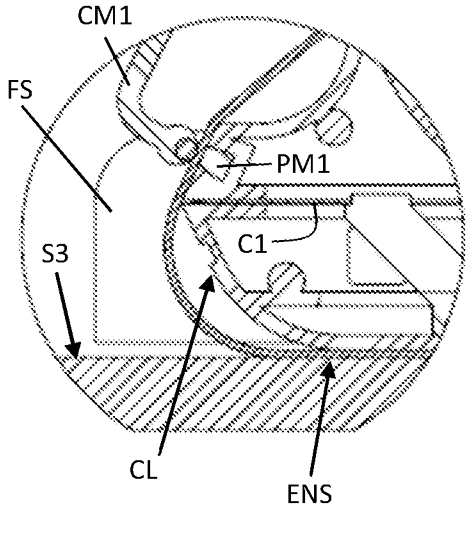
Figure 12B:
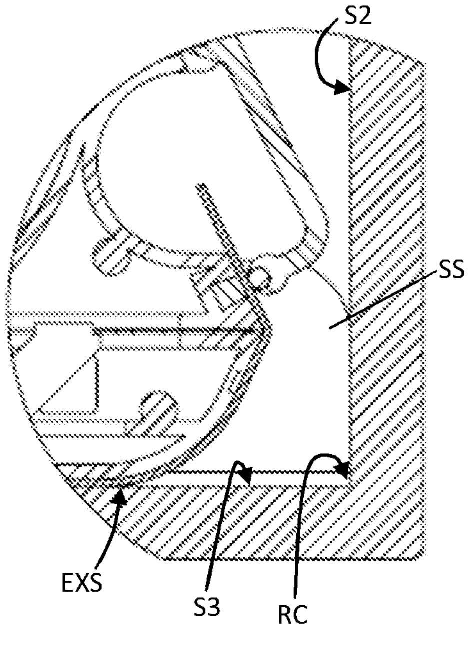

FIGS. 12A-12C show a second step in the method in which the tape dispenser while pressing the masking tape to the third surface S3 is moved towards the right corner RC, i.e. in a direction from the entry side ENS to the exit side EXS of the pressure surface, until the second spacers SS contact the second surface S2. As a result of this movement and the clamping action by the first clamping member CM1 and the permanent magnet PM1, a clearance CL may form between the masking tape and the housing in between the entry side ENS of the pressure surface and the first cutter C1 as shown clearly in FIG. 12C. At the same time, a length of the portion of masking tape extending beyond the permanent magnet PM2 has been reduced, e.g. compare the situation in FIG. 11B with the situation in FIG. 12B. The length of masking tape extending into recess RE in FIG. 11B is larger than the length of masking tape extending into recess RE in FIG. 12B.

FIGS. 13A-13D show a third step in the method in which the operating member 15 is moved in a direction towards the right corner RC until the sliding element 21 hits a stop ST1 as shown clearly in FIG. 13D thereby moving the second cutter C2 to its cutting position as shown in FIG. 13B and simultaneously the first cutter C1 to its retracted position as shown in FIG. 13C. Moving the second cutter C2 to the cutting position results in the second cutter C2 cutting masking tape downstream of the exit side EXS of the pressure surface PS.

Figure 14A:
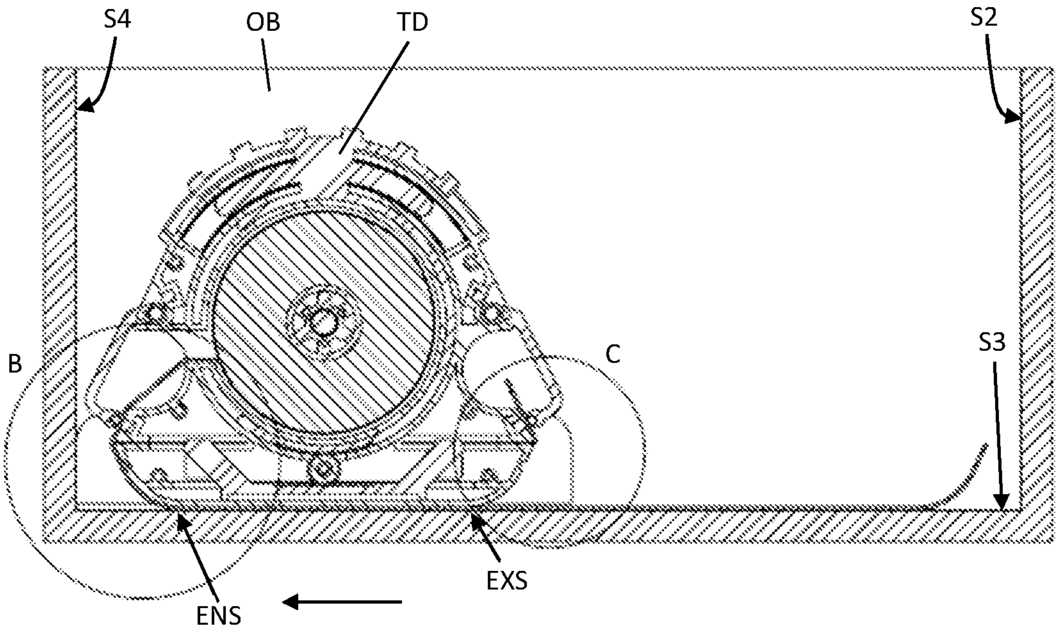
FIG. 14A-14C schematically depict a further step in an operating method for the tape dispenser of FIG. 1.
Figure 14B:
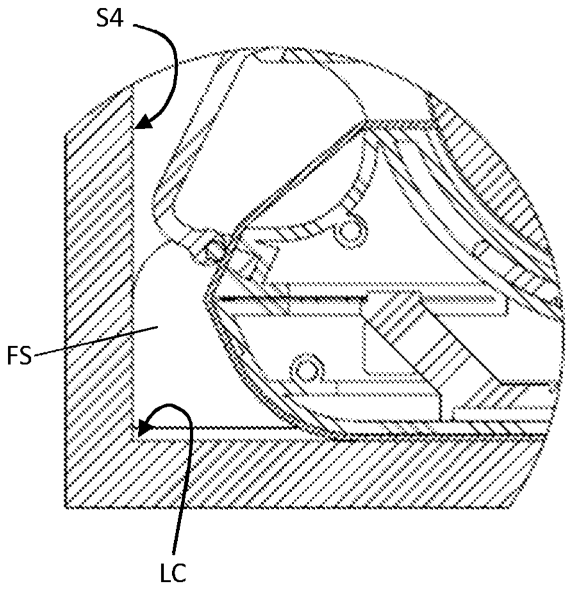
Figure 14C:
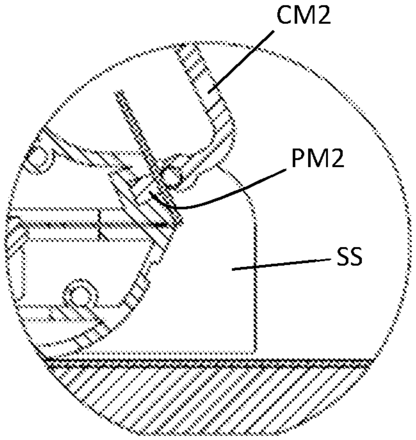

FIGS. 14A-14C show a fourth step in the method in which the tape dispenser while pressing the masking tape to the third surface S3 is moved towards the left corner LC, i.e. in a direction from the exit side EXS to the entry side ENS of the pressure surface, until the first spacers FS contact the fourth surface S4. As a result thereof masking tape is applied to the third surface S3 over the entire length expect in the right and left corners RC, LC. Please note that the clamping member CM2 and permanent magnet PM2 still hold a portion of masking tape after the cutting action described in the third step as can be clearly seen in FIG. 14C.

FIGS. 15A-15D show a fifth step in the method in which the operating member 15 is moved in a direction towards the left corner LC until the sliding element 21 hits a stop ST2 as shown clearly in FIG. 15D thereby moving the first cutter C1 to its cutting position as shown in FIG. 15B ad simultaneously the second cutter C2 to its retracted position as shown in FIG. 15C.

Figure 16:
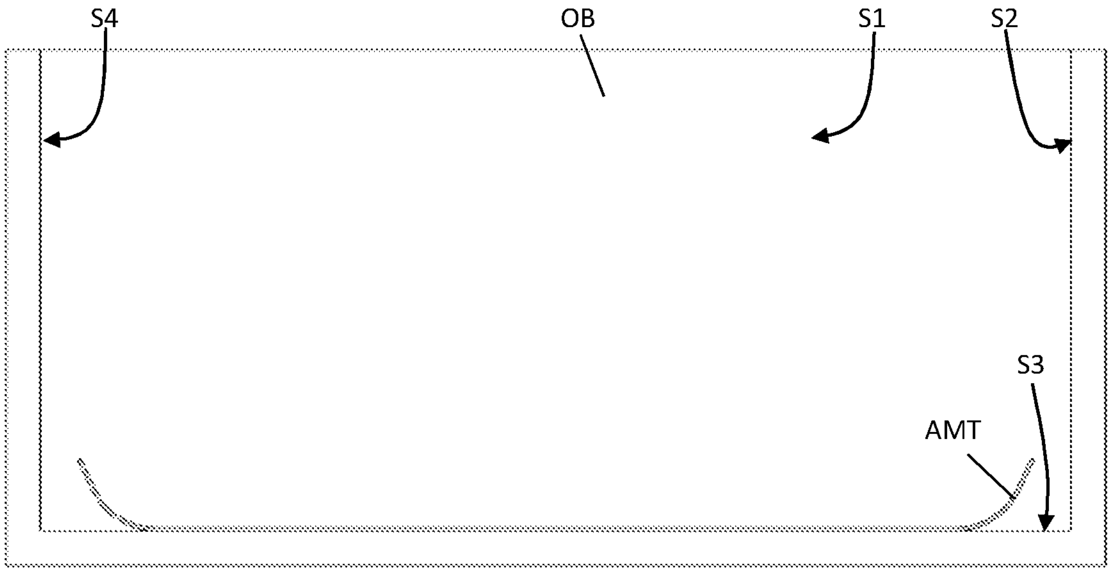
FIG. 16 schematically depicts a further step in an operating method for the tape dispenser of FIG. 1.

After the fifth step in the method, the tape dispenser TD can be removed from the object leaving the applied masking tape portion AMT on the third surface S3 as shown in FIG. 16. The pressure surface PS has been used to press the centre portion of the masking tape portion AMT to the surface S3, but both end portions could not be pressed against the surface S3 by the pressure surface PS and thus may not adhere completely or not sufficiently to the surface S3. To solve this, a manual step may be added to press these end portions to the surface S3 resulting in the situation as shown in FIG. 17.

Figure 17:
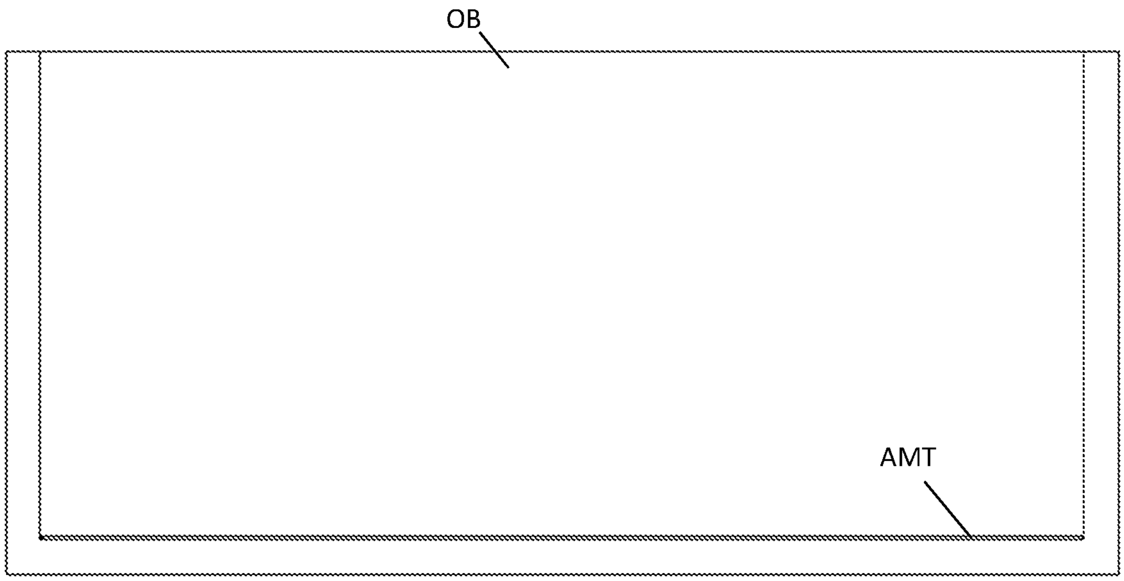
FIG. 17 schematically depicts a further step in an operating method for the tape dispenser of FIG. 1.
Figure 18A:
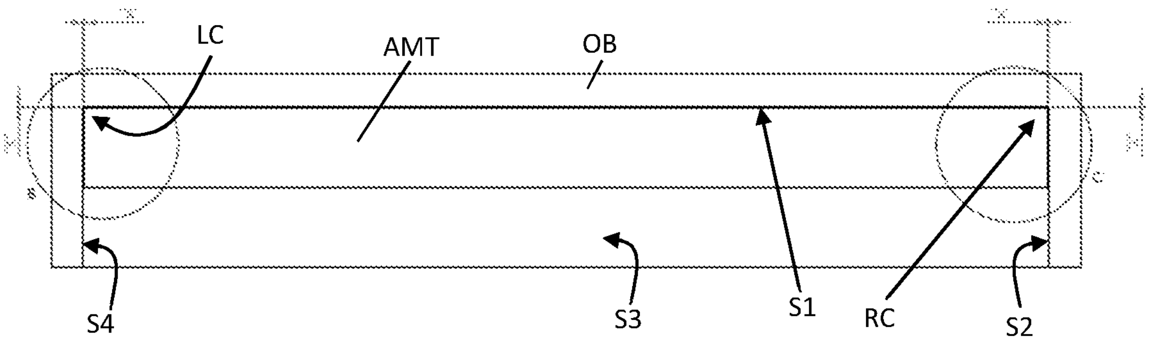
FIG. 18A-18C schematically depict in more detail the step of FIG. 17.
Figure 18B:
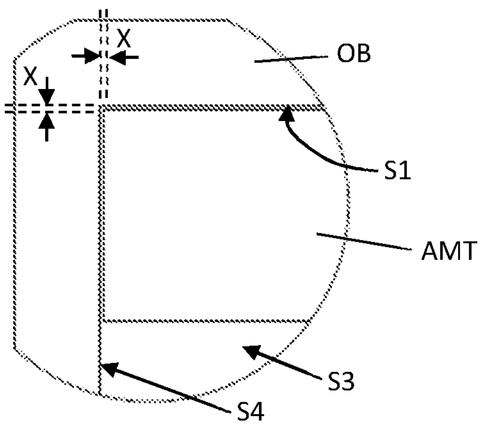
Figure 18C:
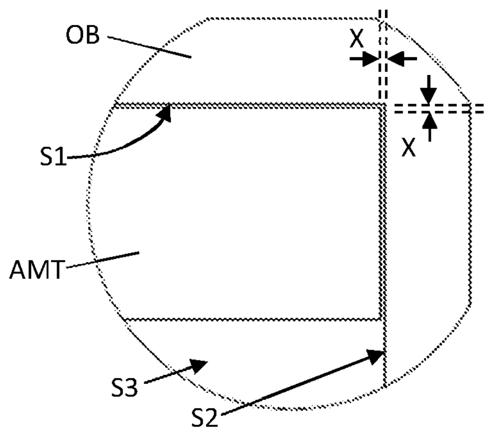

FIGS. 18A-18C relate to the same situation as depicted in FIG. 17, but now showing the applied masking tape portion AMT from above. FIG. 18A depicts an overview of the entire object, while FIG. 18B and FIG. 18C depict a detailed view of the left corner LC and the right corner RC, respectively. The distance between the masking tape portion AMT and the surface S1 is denoted X and determined in this case by the thickness of the corresponding sidewall of the tape dispenser.

Because in this embodiment, the tape dispenser is embodied in accordance with FIG. 3 where $L1=D1-0.5(W-W2)$ and $L2=D2-0.5(W-W2)$, the same distance X is also present between a free end of the applied masking tape portion AMT and the second surface S2 and between a free end of the applied masking tape portion AMT and the fourth surface S4.

Subsequent masking tape portions can be applied to the object in a similar manner as described above. For instance, a masking tape portion may be applied to the third surface S3 starting in the left corner LC and extending in a direction perpendicular to the applied masking tape AMT. Alternatively or additionally, a masking tape portion may be applied to the third surface S3 starting in the right corner RC and extending in a direction perpendicular to the applied masking tape AMT. Due to the dimensions of the tape dispenser used, the same distance X will be obtained in the corners LC and RC, so that the masking tape in the corners completely overlap.

Figure 19:
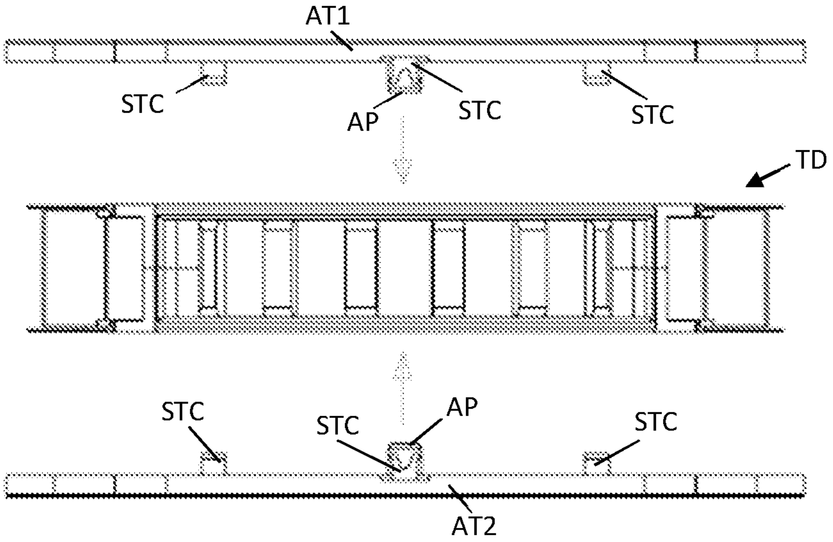
FIG. 19 schematically depicts a top view of a tape dispenser kit according to a further embodiment of the invention.
Figure 20:
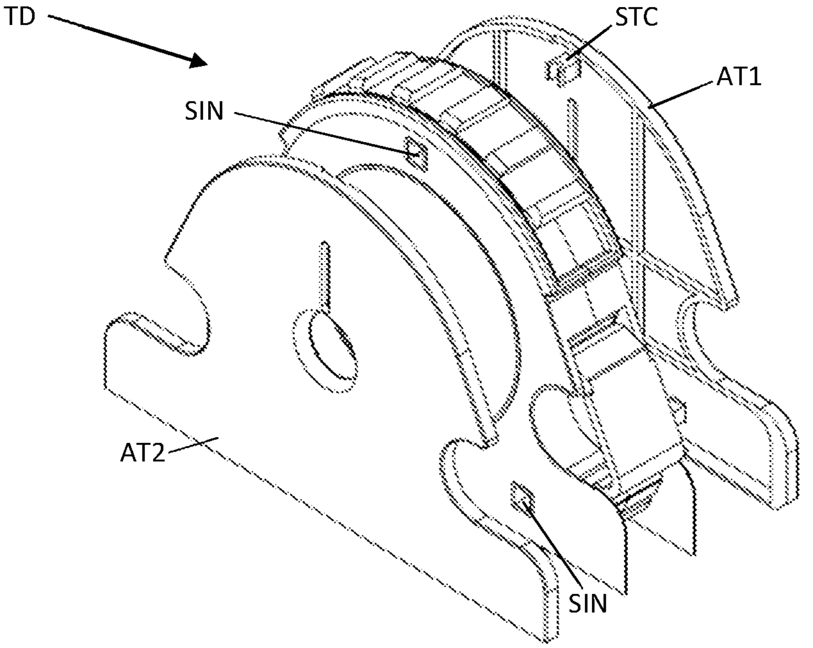
FIG. 20 schematically depicts a perspective view of the tape dispenser kit of FIG. 19.
Figure 21:
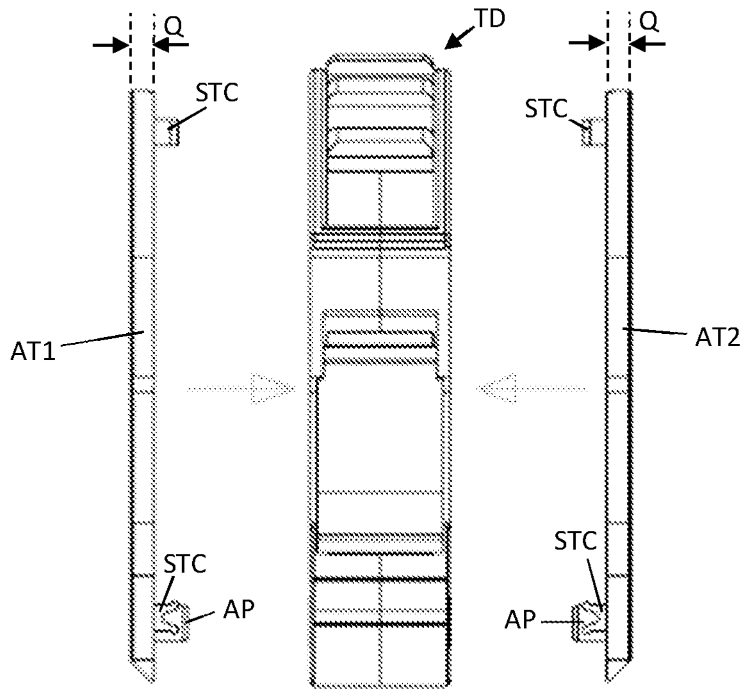
FIG. 21 schematically depicts a front view of the tape dispenser kit of FIG. 19.

FIGS. 19-22 schematically depict a tape dispenser kit according a further embodiment of the invention. FIG. 19 depicts a top view, FIG. 20 depicts a perspective view, FIG. 21 depicts a front view, FIG. 22A depicts a side view of the tape dispenser kit, and FIG. 22B depicts a cross-sectional view of the tape dispenser kit.

The tape dispenser kit comprises a tape dispenser TD, in this embodiment embodied similar to the tape dispenser shown in FIGS. 1-18C, and two attachments AT1, AT2. In FIGS. 19-22, the attachments AT1, AT2 are shown disconnected and at a distance from the tape dispenser TD. This is to show that the attachments AT1, AT2 can optionally be used in combination with the tape dispenser. To use the attachments AT1, AT2, a respective alignment pin AP is aligned with respective alignment hole AH on the tape dispenser TD and subsequently the attachments are connected to the side walls SW1, SW2, respectively, using the snap-together connectors STC on the attachments AT1, AT2 and the corresponding snap-in holes SIN in the side walls SW1, SW2, see for reference also FIG. 1.

As can be best seen in FIG. 7, a bottom of the alignment holes AH are interconnected to form a rotation axle AX for the gear 13.

Instead of snap-fits, other temporarily connections, such as a clamping connection may also be envisaged to temporarily connect the attachments AT1, AT2 to the tape dispenser TD.

One function of the attachments AT1, AT2 may be to simply add material to the side walls SW1, SW2, thereby setting the distance between applied masking tape AMT and the surface S1 to another, i.e. higher, value. The kit may comprise for instance different sets of attachments AT1, AT2, each setting the distance between applied masking tape AMT and the surface S1 to a particular value.

Figure 22A:
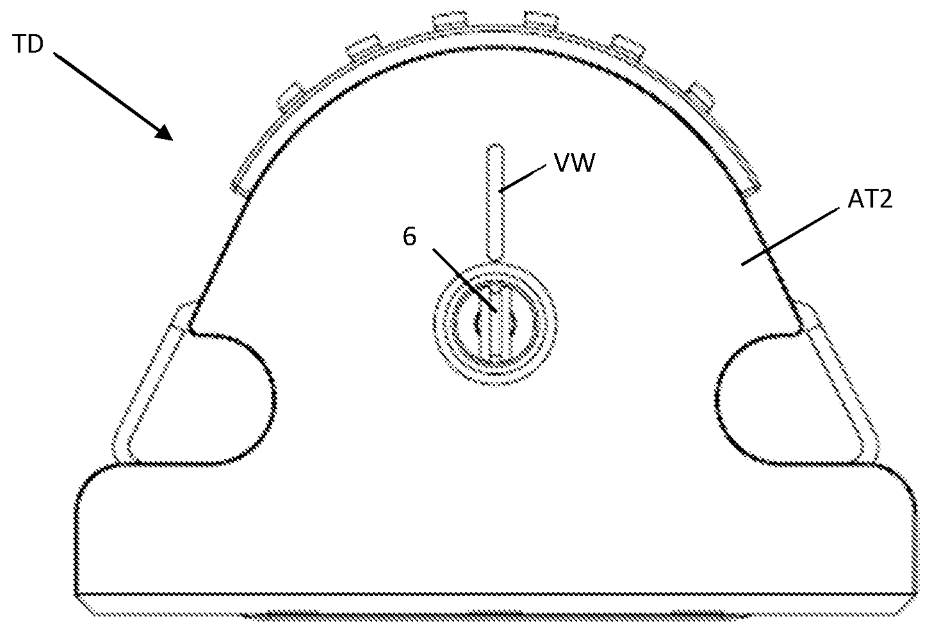
FIG. 22A schematically depicts a side view of the tape dispenser kit of FIG. 19.
Figure 22B:
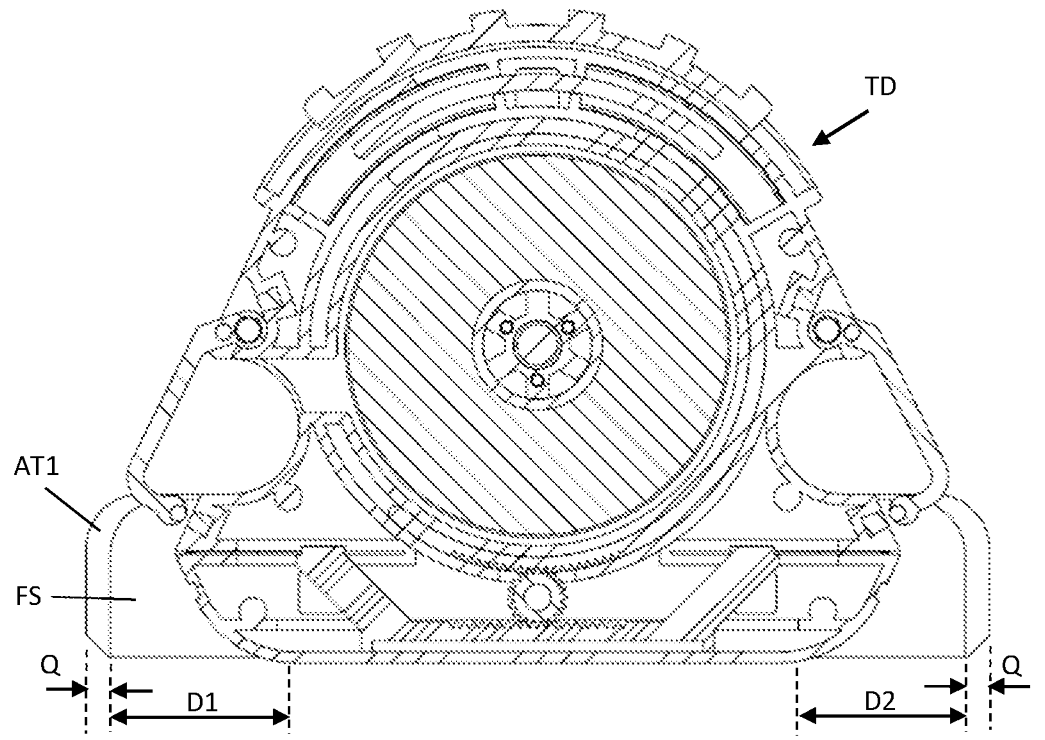
FIG. 22B schematically depicts a cross-sectional view of the tape dispenser kit of FIG. 19.

Additionally, the function of the attachments AT1, AT2 may be to take over the spacing function of the first spacers FS and/or second spacers SS as shown in FIG. 22B where a portion of the attachment AT1 extends beyond the first spacer over a distance Q, thereby setting the distance between the free ends of the applied masking tape AMT and the surfaces S2 and S4 to another value, namely X+Q, preferably to the same value as the distance between the applied masking tape AMT and the surface S1 when the thickness of the attachments is also Q.

Figure 23:
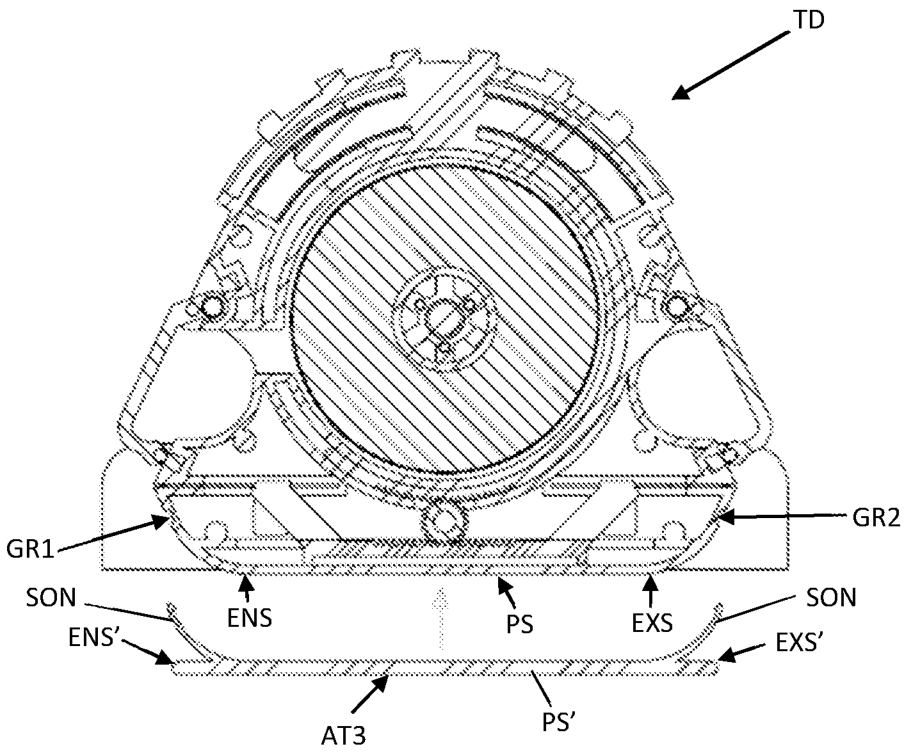
FIG. 23 schematically depicts a cross-sectional view of a tape dispenser kit according to yet another embodiment of the invention.

FIG. 23 and FIGS. 24A-24C schematically depict a tape dispenser kit according to yet another embodiment of the invention. All figures are cross-sectional views similar to the cross sectional view of FIG. 3, wherein in FIG. 23 a tape dispenser TD is shown similarly embodied as the tape dispenser shown in FIGS. 1-18C, and one attachment AT3. In FIG. 23, the attachment AT3 is shown disconnected at a distance from the tape dispenser TD. This is to show that the attachment AT3 can optionally be used in combination with the tape dispenser. To use the attachment AT3, the attachment is connected to the pressure surface using the snap-on connectors SON on the attachment AT3 and the corresponding grooves GR1, GR2 arranged on the housing H between the entry side ENS and the first cutter C1 and the exit side EXS and the second cutter C2.

Figure 24A:
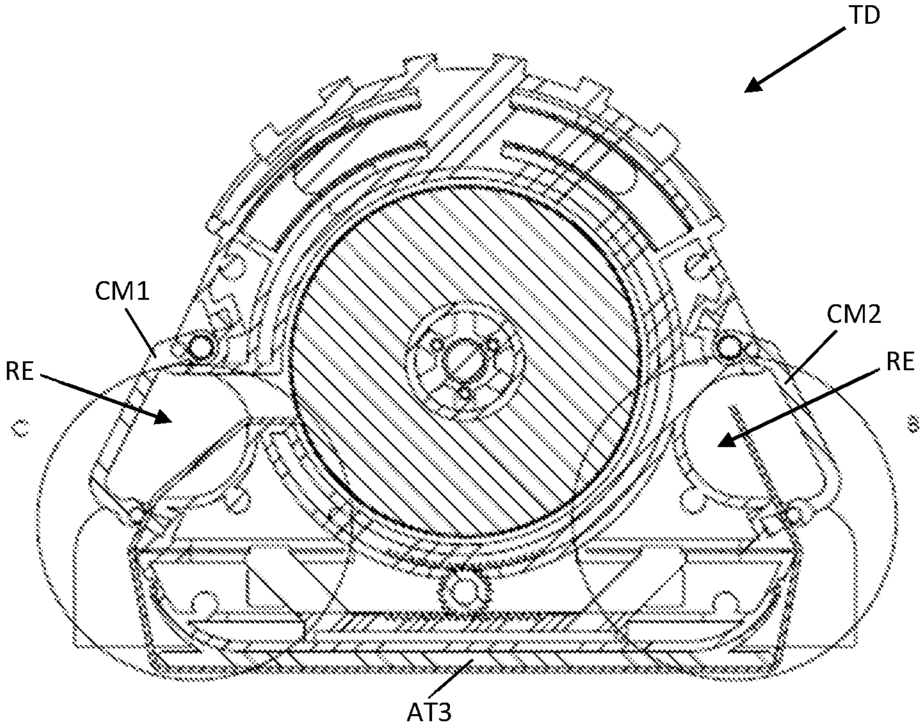
FIG. 24A-24C schematically depict in more detail the tape dispenser kit of FIG. 23 including tape.
Figure 24C:
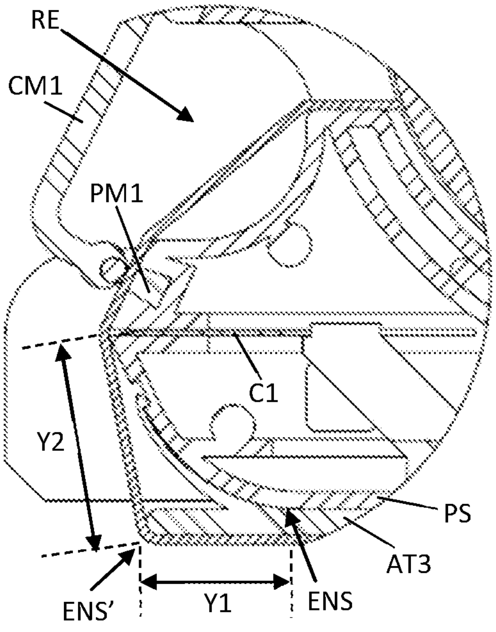
Figure 24B:
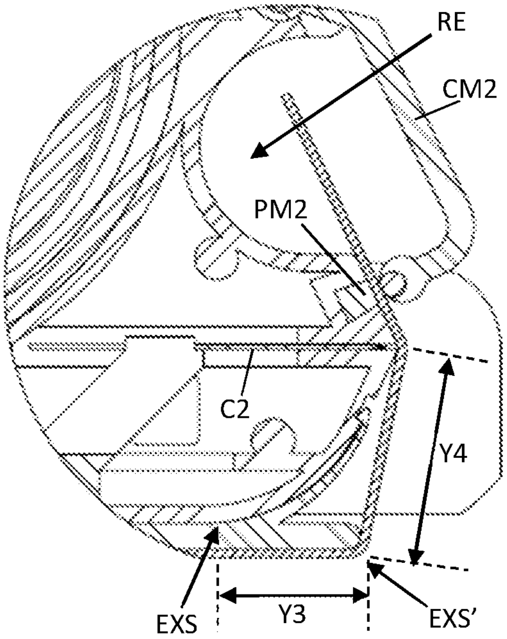

The attachment AT3 then functions as a replacement for the pressure surface PS and defines its own pressure surface PS' including entry side ENS' and exit side EXS'. In FIGS. 24A, 24B and 24C, the attachment AT3 is shown when attached to the tape dispenser TD. The situation is similar to the situation as depicted in FIG. 10A-10C. An advantage of using the attachment AT3 is that the length of masking tape Y1+Y2>L1 and the length of masking tape Y3+Y4>L2.

Figure 25A:
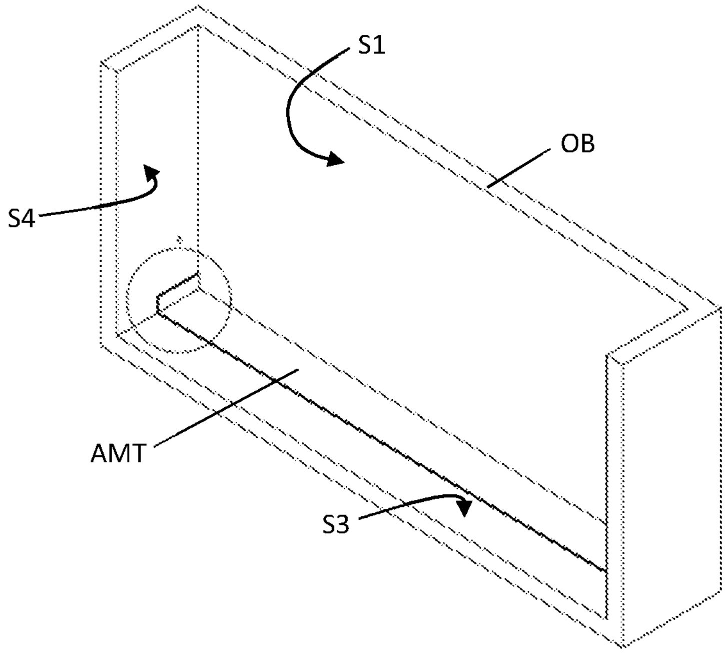
FIG. 25A-25B schematically depict a possible end result of using the tape dispenser kit of FIG. 23.
Figure 25B:
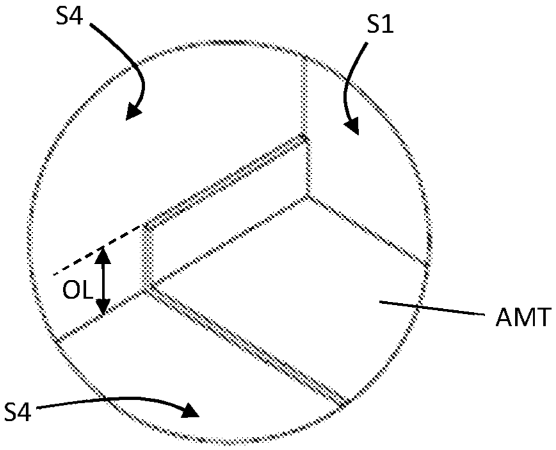

An advantage of attachment AT3 with the additional length of masking tape between the first and second cutter is that when masking tape is applied to a third surface of an object OB similar as described before, the applied masking tape does not keep a distance X to the first surface S1 with its free end, but extends onto the first surface over a length OL as shown in FIGS. 25A and 25B.

FIGS. 26A to 29B schematically depict a tape dispenser TD according to another embodiment of the invention. The tape dispenser TD according to this embodiment has many similarities with the embodiment depicted in FIGS. 1-7. Hence, in the below description, emphasis will be given to the differences between the two embodiments. For a detailed description of the similarities reference is made to the description corresponding to the embodiment of FIGS. 1-7 supplemented with the information provided below.

Figure 26A:
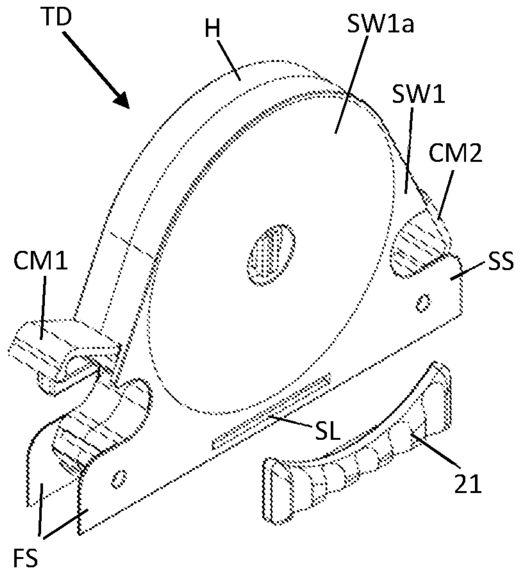
FIG. 26A-26B schematically depict a perspective view of a tape dispenser according to another embodiment of the invention.
Figure 26B:
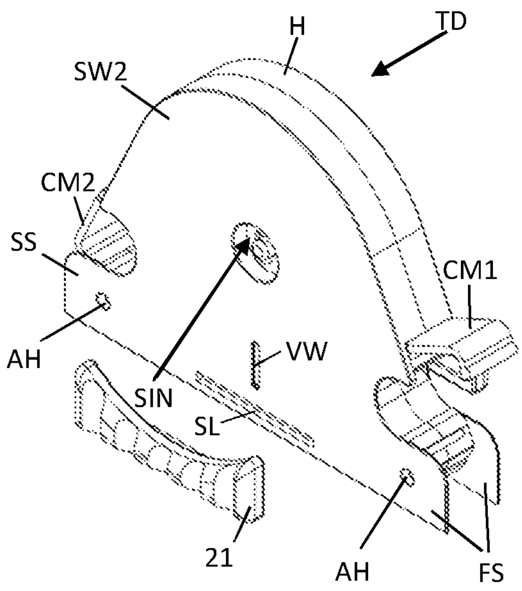
Figure 27:
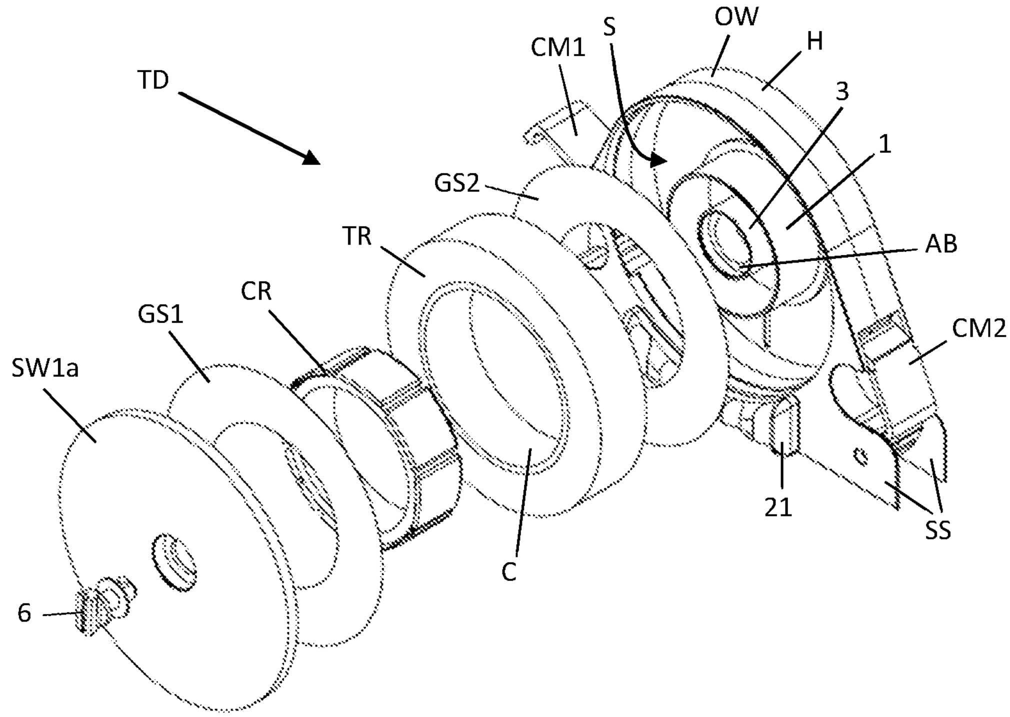
FIG. 27 schematically depicts an exploded view of the tape dispenser of FIG. 26A.
Figure 29A:
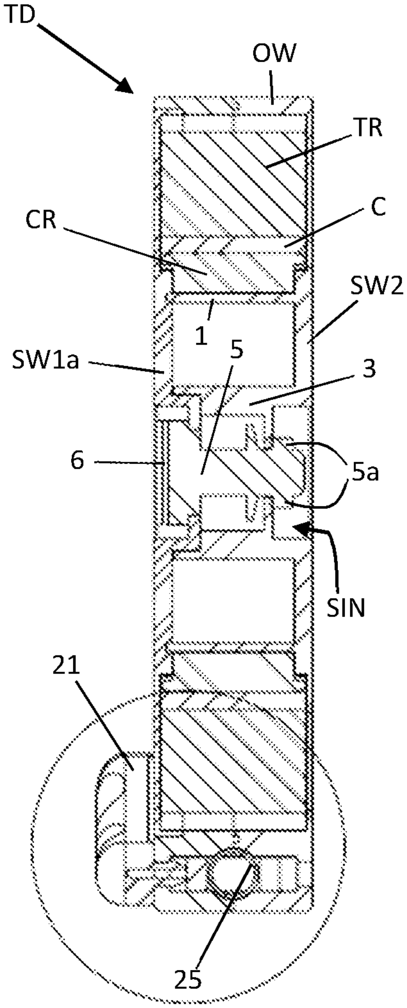
FIG. 29A-29B schematically depicts a cross-sectional view of the tape dispenser of FIG. 26A along a plane perpendicular to the longitudinal axis of the tape dispenser.
Figure 29B:
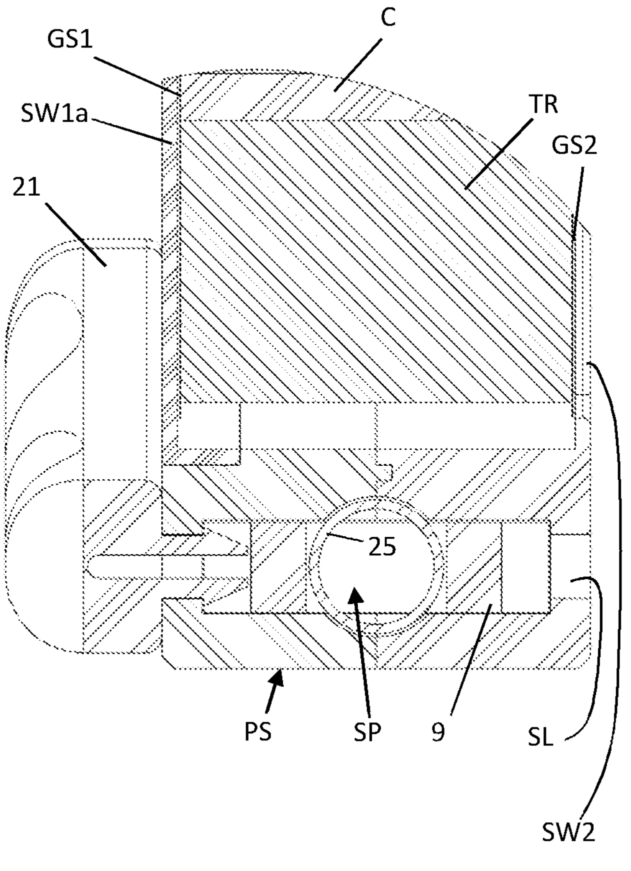

FIG. 26A depicts a perspective view of one side of the tape dispenser TD and FIG. 26B depicts a perspective view of the other side of the tape dispenser TD. FIG. 27 depicts an exploded perspective view of the situation in FIG. 26A. FIG. 28A depicts a cross-sectional view of the tape dispenser TD along a plane parallel to a longitudinal direction of the tape dispenser TD and FIGS. 28B-28D depict details thereof. FIG. 29A depicts a cross-sectional view of the tape dispenser TD along a plane perpendicular to the longitudinal direction of the tape dispenser, and FIG. 29B depicts a detail thereof.

The tape dispenser TD comprises a housing H with a space S delimited by a wall 1, an outer wall OW, a side wall portion SW1*a* of a side wall SW1, and side wall SW2 to accommodate a roll TR of masking tape.

The housing H comprises an opening 7 allowing masking tape to extend from the roll TR through the opening 7 around the housing towards a pressure surface PS at a bottom of the tape dispenser TD.

The pressure surface PS has a length extending from an entry side ENS to an exit side EXS of the pressure surface PS. The pressure surface PS also has a width, which is the dimension of the pressure surface PS in a direction perpendicular to the longitudinal direction.

The housing H and the pressure surface PS are configured to guide masking tape from the roll TR of masking tape via the entry side ENS of the pressure surface PS along the pressure surface PS towards the exit side EXS of the pressure surface in a longitudinal direction LD of the pressure surface PS, which longitudinal direction is parallel to the longitudinal direction of the tape dispenser itself.

The tape dispenser TD further comprises a first cutter C1 to cut masking tape upstream of the entry side ENS of the pressure surface PS, and a second cutter C2 to cut masking tape downstream of the exit side EXS of the pressure surface PS. The first cutter C1 and the second cutter C2 in the FIGS. 28A, 28B and 28D are in a rest position, in which the first and second cutter C1, C2 do not extend beyond the housing H and thus masking tape is able to pass the first and second cutter C1, C2 without engaging with the first and second cutter C1, C2.

The main differences between the embodiment of FIGS. 1-7 and the currently described embodiment are the configuration and location of the actuation system to selectively operate the first cutter C1 and the second cutter C2, and the configuration and size of the roll TR of masking tape that can be accommodated in the tape dispenser TD.

Similar to the embodiment of FIGS. 1-7, the actuation system comprises a slider 9, wherein the first and second cutter C1, C2 are connected to the slider 9. Moving the slider 9 to the left in FIG. 28A, i.e. towards the first cutter C1 or towards the entry side ENS of the pressure surface, will move the first cutter C1 from the shown rest position to a cutting position in which the first cutter C1 extends beyond the housing H to engage with masking tape. Moving the slider 9 to the right in FIG. 28A, i.e. towards the second cutter C2 or towards the exit side EXS of the pressure surface, will move the second cutter C2 from the shown rest position to a cutting position in which the second cutter C2 extends beyond the housing H to engage with masking tape. Due to the fact that both the first and second cutter C1, C2 are connected to a common slider 9 and move simultaneously, the first cutter C1 is moved to a retracted position when the second cutter C2 is moved to its cutting position and likewise the second cutter C2 is moved to a retracted position when the first cutter C1 is moved to its cutting position.

The actuation system further comprises a sliding element 21 that can be connected to the slider 9 inside the tape dispenser TD via corresponding slits SL in the side walls SW1, SW2. As shown in FIGS. 26A and 26B, a sliding element 21 can be provided at either side, but the design of this embodiment is such that it is also possible to use only one sliding element 21, e.g. at the side wall SW1 as shown in FIGS. 29A and 29B. An advantage of using only one sliding element 21 at the side wall SW1 is that the side wall SW2 can be used as reference surface for aligning the masking tape dispensed from the tape dispenser TD with an object.

The actuation system also comprises a spring 25 arranged inside a space SP arranged in the housing H and the slider 9 as can be best seen in FIGS. 28A, 28C, 29A and 29B. The spring 25 has a first end 25*a* and a second end 25*b*. In the rest position of the first and second cutter C1, C2, the first end 25*a* of the spring 25 engages with both the housing H and the slider 9 and at the same time the second end 25*b* of the spring 25 also engages with both the housing H and the slider 9. This position of the slider 9 and the spring 25 results is an equilibrium position. When the slider 9 is moved to the right in FIGS. 28A and 28C, the first end 25*a* of the spring 25 moves along with the slider 9 and disengages from the housing H thereby decreasing in length. Similarly, when the slider 9 is moved from the rest position to the left the second end 25*b* is moved along with the slider 9 and disengages from the housing H thereby decreasing in length. The decrease in length increases the spring force applied to the slider 9 which can be overcome manually, but which urges the slider 9 back to the equilibrium position when the slider is released or the force applied to it is reduced. An advantage of this actuation system is that it makes efficient use of the available space between the roll TR and the pressure surface PS and thus allows to keep the height of the tape dispenser small and/or to use a larger diameter roll TR compared to the embodiment of FIGS. 1-7. An advantage of the actuation system of the embodiment of FIGS. 1-7 is that both sidewalls SW1, SW2 can be used as a reference surface.

The tape dispenser TD also comprises a first clamping mechanism including permanent magnet PM1 arranged on the housing H and a clamping member CM1 cooperation with the permanent magnet PM1. Similarly, the tape dispenser TD comprises a second clamping mechanism including permanent magnet PM2 arranged on the housing H and a clamping member CM2 cooperating with the permanent magnet PM2. The first and second clamping mechanism further each include an associated recess RE in the housing H, which allows to open a clamping member, to draw a portion of masking tape from the roll TR, insert a finger in the recess RE to hold the masking tape, and to close the clamping member without interfering with the finger in the recess RE.

The housing H is further provided with a third permanent magnet PM3 and a fourth permanent magnet PM4, respectively provided to exert a holding force to the first and second clamping member CM1, CM2 when the clamping member is in an open position as shown for the first clamping member CM1 in the respective drawings. The first permanent magnet PM1 and the second permanent magnet PM2 are respectively provided to exert a clamping force to the first and second clamping member CM1, CM2 when the clamping member is in a closed position as shown fir the second clamping member CM2 in the respective drawings.

The tape dispenser comprises two first spacers FS, arranged at the entry side ENS of the tape dispenser, and two second spacers SS, arranged at the exit side EXS of the tape dispenser TD, defining a respective distance between a free end of the spacers and the respective entry side ENS and exit side EXS to cut the masking tape using the first cutter C1 or the second cutter C2 to a desired length when the spacer makes contact with a surface of an object or other reference surface.

As can be best seen in FIGS. 27 and 29A, the side wall portion SW1*a* is releasably mounted to the housing H using a connecting element 6. The connecting element 6 may for instance be configured to connect the portion SW1*a* to a member 3 on the side wall SW2 using a bayonet mount in which the connecting element comprises a shaft 5 with cams 5*a* that catch behind respective shoulders or flange portions of the member 3 upon sufficient rotation of the connecting element 6 about a longitudinal axis thereof while reverse rotation releases the mount.

By removing the side wall portion SW1*a*, access is gained to the space S allowing to insert a roll TR of tape and for instance to remove a core C of an empty roll TR of tape. To see how much tape is still present on the core C of the roll TR of tape, a viewing window VW is provided in side wall SW2.

In this embodiment, a roll TR of masking tape is provided on a clamping ring CR to be received in the space S. The clamping ring CR is then provided between the core C of the roll TR and the cylindrical wall 1, so that the clamping ring CR and thus the roll TR can rotate about a rotation axis defined by the cylindrical wall 1. Although not necessary, but preferably, the clamping ring has a width that is substantially equal to the internal width of the space S, so that the clamping ring cannot move or the movement is limited and insignificant in a sideways direction, which has the advantage that when a roll TR is clamped on a clamping ring, the roll TR is held in the same transverse position relative to the clamping roll CR and thus the space S. It is then possible to align each roll TR in a similar manner to the side wall SW2 acting as a reference surface resulting in a reliable tape dispenser also for masking tape that has a width smaller than the width of the space S.

In this embodiment, the member 3 also provides an abutment AB for the side wall portion SW1*a* allowing to provide a support for the side wall portion SW1*a* and the connecting element 6 and indicating when the connecting element has been introduced sufficiently far into the member 3 so that rotation of the connecting element 6 results in the cams 5*a* locking behind the respective shoulder of the member 3.

The clamping ring CR and the wall 1 are preferably configured such that friction during rotation is limited. In order to reduce friction between the roll TR and the side wall portion SW1 and the side wall SW2, a guiding sheet GS1, GS2 per side surface of the roll TR of masking tape may be provided to cover at least partially the masking tape wound on the core C. The guiding sheets GS1, GS2 may for instance be re-used with each new roll TR or may be consumable and replaced along with each new roll TR.

In order to align the roll TR on the clamping ring CR, the roll TR may be provided on a reference surface such as for instance the top surface of a table and then the clamping ring CR may be pushed in the core C until the clamping ring CR reaches the same reference surface. When the reference surface side of the combination of roll TR and clamping ring CR is introduced to be adjacent the side wall SW2, the roll TR is aligned with respect to the reference surface provided by side wall SW2 and reliable tape dispensing can be obtained.

It is noted that the sliding element 21 in the equilibrium position does not interfere with the side wall portion SW1*a* to insert or remove a roll TR due to the curved shape at the upper side of the sliding element 21 that follows the contour of the side wall portion SW1*a*.

Figure 30:
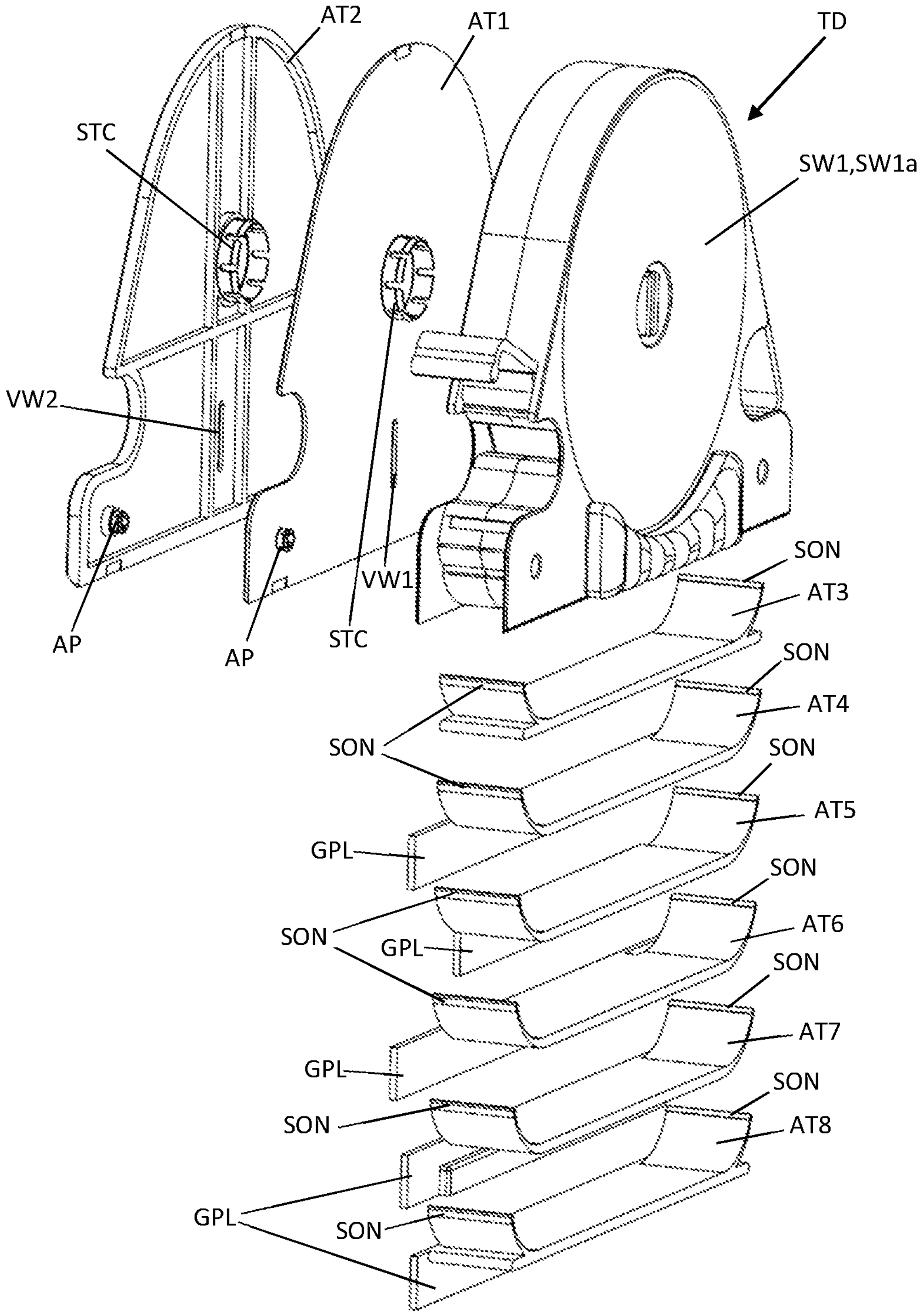
FIG. 30 schematically depicts an exploded view of a tape dispenser kit according to yet another embodiment of the invention.

FIG. 30 depicts the tape dispenser TD according to the embodiment of FIGS. 26A-29B as part of a tape dispenser kit according to yet another embodiment of the invention. The tape dispenser kit is depicted as an exploded view of the tape dispenser TD and 8 possible attachments AT1-AT8. Each of the attachments AT1-AT8 can optionally be used in combination with the tape dispenser TD. The tape dispenser kit thus does not necessarily has to include all attachments AT1-AT8. Any combination of tape dispenser TD and one or more of the attachments AT1-AT8 forms a tape dispenser kit according to the invention.

To connect attachment AT1 or AT2 to the tape dispenser TD, alignment pins AP on the attachment AT1, AT2 are aligned with alignment holes AH at the side wall SW2 (see FIG. 26B) and subsequently, the connection elements STC are received in hole SIN.

One function of the attachments AT1, AT2 may be to add material to the side wall SW2, thereby shifting the reference surface formed by the side wall SW2 to a reference surface formed by attachment AT1 or AT2 which is at a larger distance from the space S. The difference between the attachments AT1 and AT2 may be the thickness added to the side wall SW2 and/or the extension it forms for the first and second spacers FS, SS. The attachments AT1, AT2 may further comprise corresponding viewing windows VW1, VW2 that are aligned with the viewing window VW in the side wall SW2 when the attachment is attached to the side wall SW2.

Figure 36:
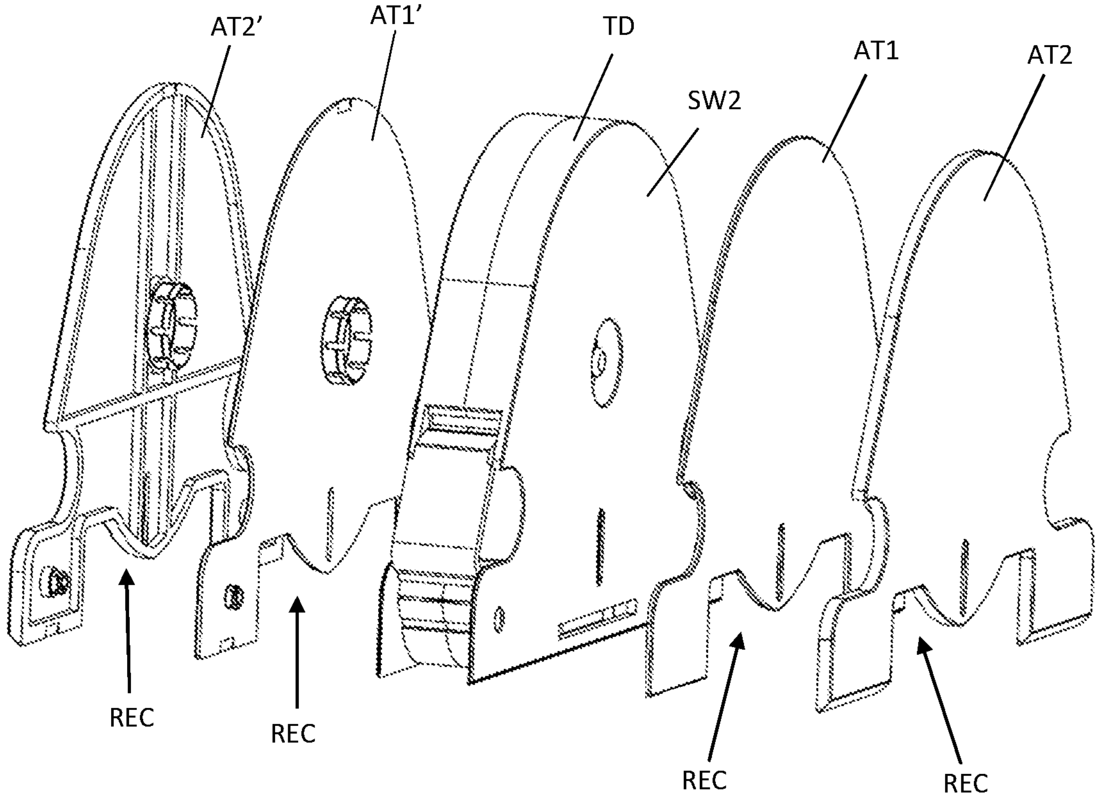

Although not shown in the embodiment of FIG. 30, but FIG. 36 schematically depicts an alternative embodiment showing attachments AT1',AT2' similar to the attachments AT1, AT2 that may be used at the side wall SW1 side of the tape dispenser to add material in the same manner at this side of the tape dispenser as shown in FIG. 30 for side wall SW2. It is possible that attachments AT1, AT1' form a pair of attachments that are used together. The same is possible for the attachments AT2, AT2'.

Although not shown in the embodiment of FIG. 30, the attachments AT1, AT2, and thus also attachments AT1', AT2', may comprise recesses REC at the bottom to allow a sliding element 21 to be connected to and moved relative to the tape dispenser TD. Such recesses REC are not necessary if it is deliberately chosen to connect the sliding element 21 at the other side of the tape dispenser only.

It is further noted that the tape dispenser TD and the tape dispenser kit may be used similarly as described in relation to FIGS. 9A to 22B, but that this description will be not be unduly repeated here again.

The attachment AT3 is similar to the one shown in FIGS. 23-24B, including snap-on connectors SON that allow to connect the attachment AT3 to the grooves GR1, GR2 (see FIG. 28A). The use of this attachment AT3 is similar to the embodiments described in FIGS. 23-25B.

All other attachments AT4-AT8 also include the snap-on connectors SON allowing to connect the respective attachment to the tape dispenser TD by mating to the grooves GR1, GR2. The attachments AT4-AT8 all also include a guiding plate GPL, the working thereof will be described by reference to FIGS. 31 to 35B.

To describe the use of the attachments AT4-AT8, an object OB is used, which object may represent a frame, e.g. a window frame or a door frame. Visible in the drawings are a top surface S1, inner side surfaces S2 and S3, external side surfaces S4, S5, inner top edges E1-E4 and outer top edges E5-E8.

Figure 31:
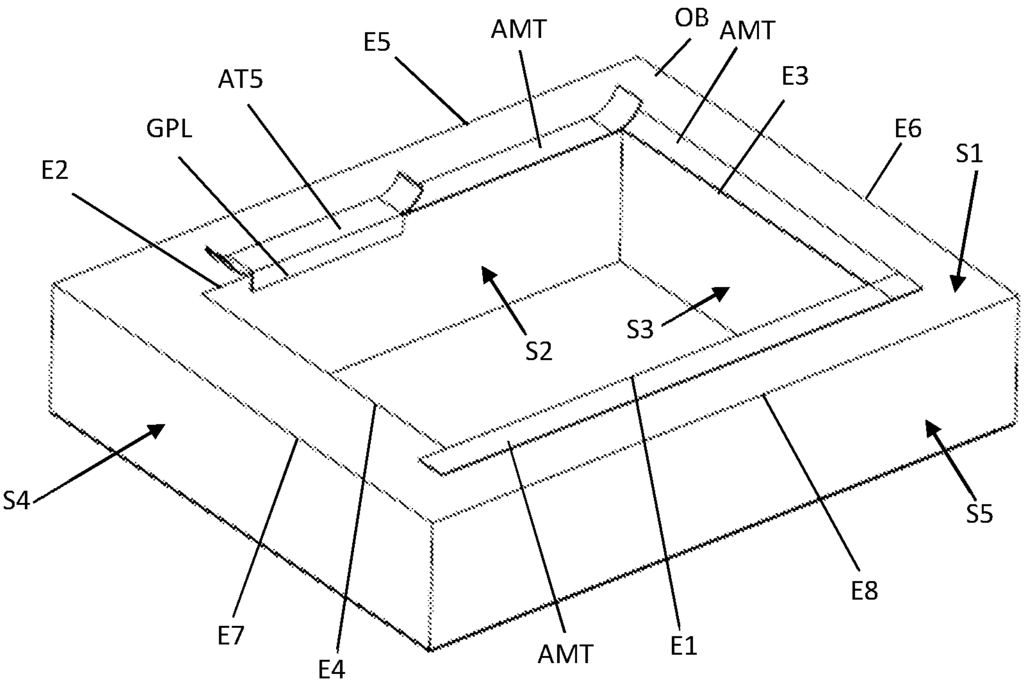
FIG. 31 schematically depicts a first use of the tape dispenser kit of FIG. 30.

FIG. 31 depicts the application of masking tape on the top surface S1 along the edges E1-E4 using attachment AT5. In FIG. 31, the tape dispenser is not depicted for clarity reasons, but only attachment AT5. However, the skilled person will understand that in order to apply the masking tape the tape dispenser and the attachment AT5 are combined and used together. Applied masking tape is indicated using reference symbol AMT.

The guiding plate GPL of attachment AT5 is configured such that the masking tape AMT can be applied along the inner edges with some overlap at the corners. To this end, the guiding plate GPL is brought into engagement with the inner surfaces, e.g. the surfaces S2 and S3 and moved from one corner to the other corner until the guiding plate GPL hits the other inner surface. In each corner, the first cutter or the second cutter is operated to cut the masking tape.

Figure 32:
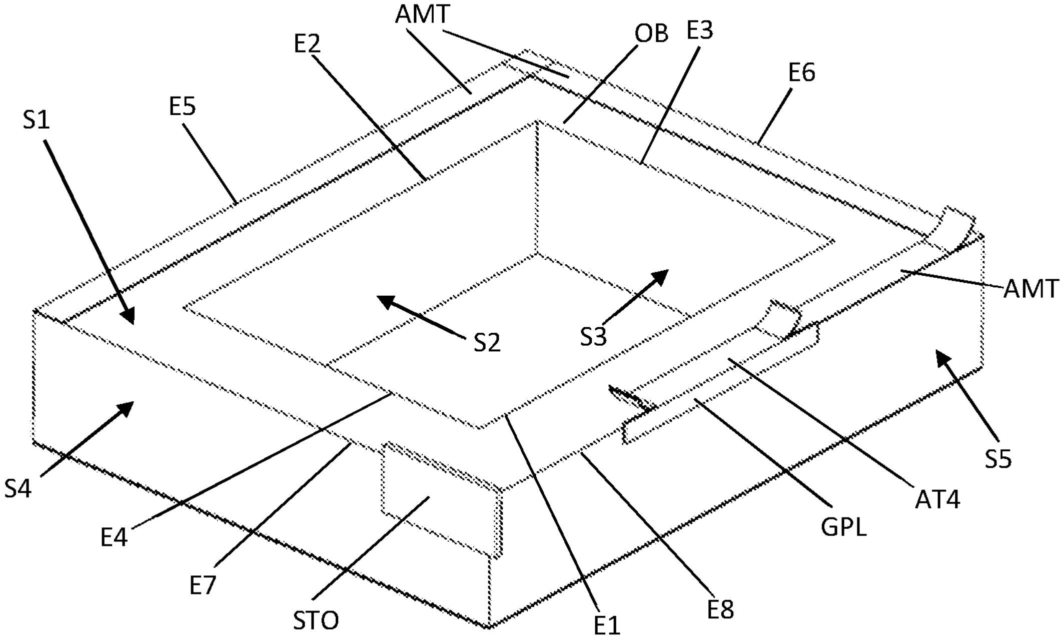
FIG. 32 schematically depicts a second use of the tape dispenser kit of FIG. 30.

FIG. 32 depicts the application of masking tape AMT on the top surface S1 along the outer top edges E5-E8 using attachment AT4. Again, only the attachment AT4 is depicted and not the tape dispenser connected thereto. The guiding plate GPL is configured to apply masking tape along the outer edges with some overlap at the corners. To this end, the guiding plate GPL is brought into engagement with the outer surfaces, e.g. the surfaces S4 and S5 and moved from one corner to the other corner. A stop STO can be used to stop at the corner such that when the masking tape is cut, it is cut to a length sufficient to reach the outer edge. Hence, as shown in FIG. 32, the masking tape is applied along outer edge E8 until the guiding plate GPL hits the stop STO held against the surface S4. When the masking tape is cut, it has a length to cover the top surface until the edge E4. This stop STO can be used at any corner to cut the masking tape to the desired length.

Figure 33:
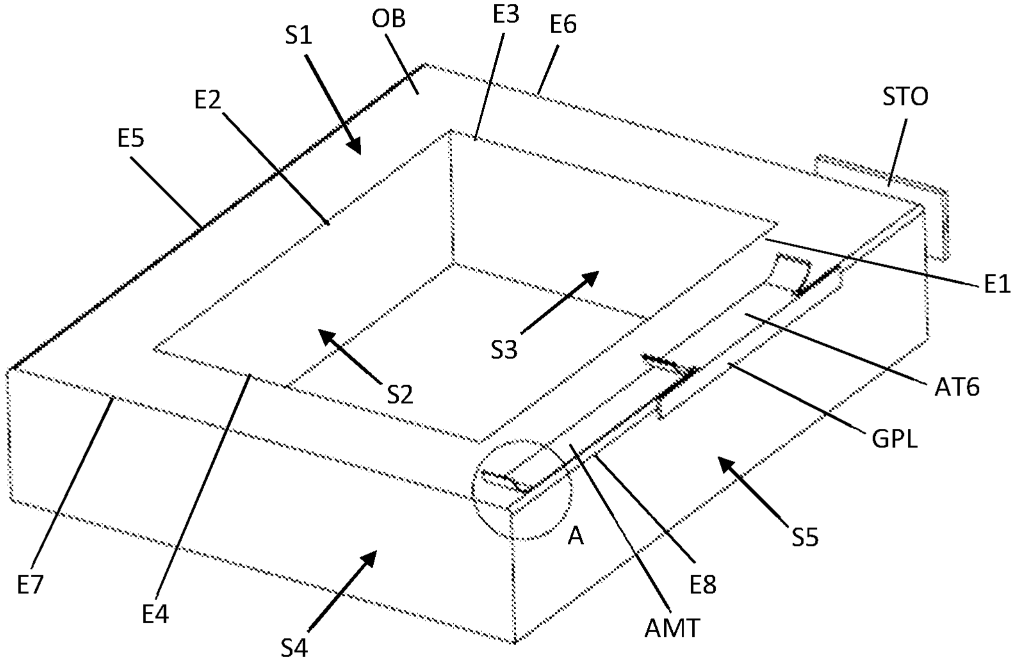
FIGS. 33-33A schematically depict a third use of the tape dispenser kit of FIG. 30.
Figure 33A:
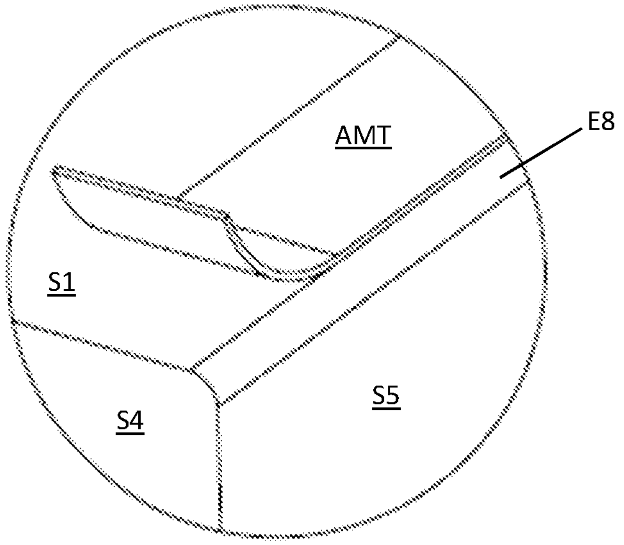

FIG. 32 assumes that the edges E5-E8 are sharp edges. However, in some instances, the edges E5-E8 are rounded and one has to choose whether to apply the masking tape AMT to the rounded edge or not. In FIG. 33, the application of masking tape on the top surface S1 along the outer top edges E5-E8 using attachment AT6 is depicted. The differences with the situation of FIG. 32 and the attachment AT4 is that the guiding plate GPL is at a larger distance from the pressure surface of the tape dispenser, so that when the guiding plate GPL is engaged with the outer surface, the corresponding edge is kept free and the masking tape is applied to the top surface S1 without covering the edge. FIG. 33A depicts a detail of the corner A in FIG. 33 and clearly shows that the masking tape is applied along edge E8 without covering it.

Figure 35:
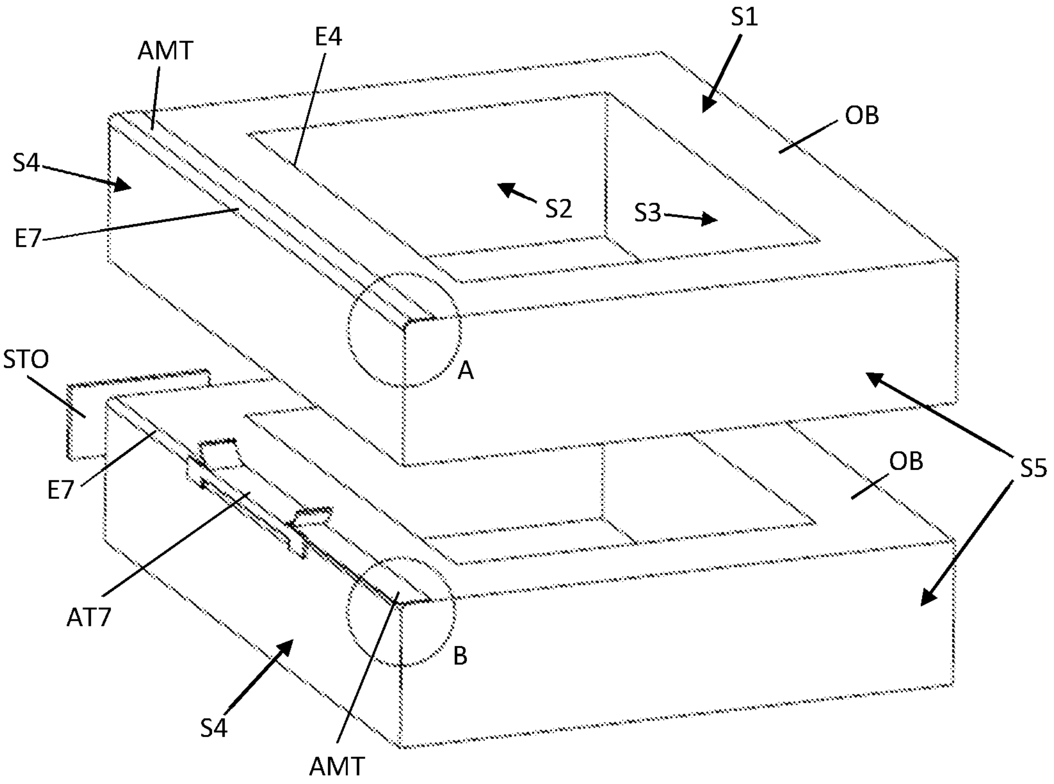
FIGS. 35-35B schematically depict a fifth use of the tape dispenser kit of FIG. 30, and FIG. 36 schematically depicts an alternative embodiment of the tape dispenser of FIG. 30.
Figure 35A:
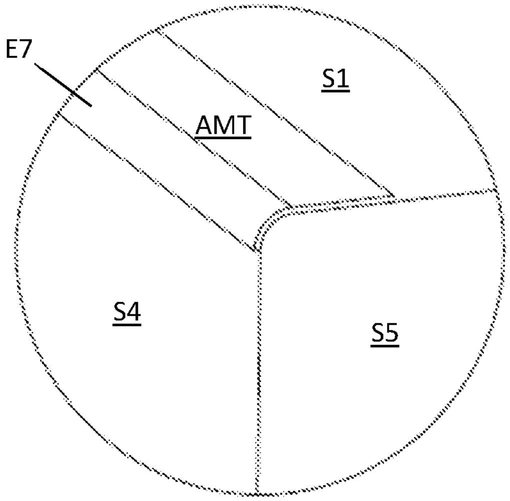
Figure 35B:
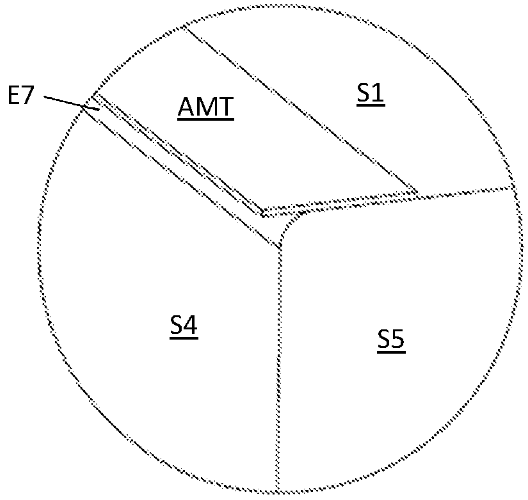

In FIG. 35, the application of masking tape on the top surface S1 along the outer top edges E5-E8 using attachment AT7 is depicted. The differences with the situation of FIG. 32 and the attachment AT4 is that the guiding plate GPL comprises a protrusion below the pressure surface PS of the tape dispenser to engage with an outer surface. In FIG. 35 two situations are shown above each other. With respect to the lower object, the attachment AT7 is used to apply masking tape to the top surface. FIG. 35B depicts corner B after application of the masking tape using the tape dispenser and attachment AT7. The masking tape is applied such that the masking tape extends from the top surface S1 above the edge E7. After application of the masking tape, the masking tape extending above the edge E7 is pressed against the edge E7 to cover the edge E7 along with a portion of the top surface S1 as shown in FIG. 35A for corner A of the situation shown with respect to the upper object in FIG. 35.

Figure 34:
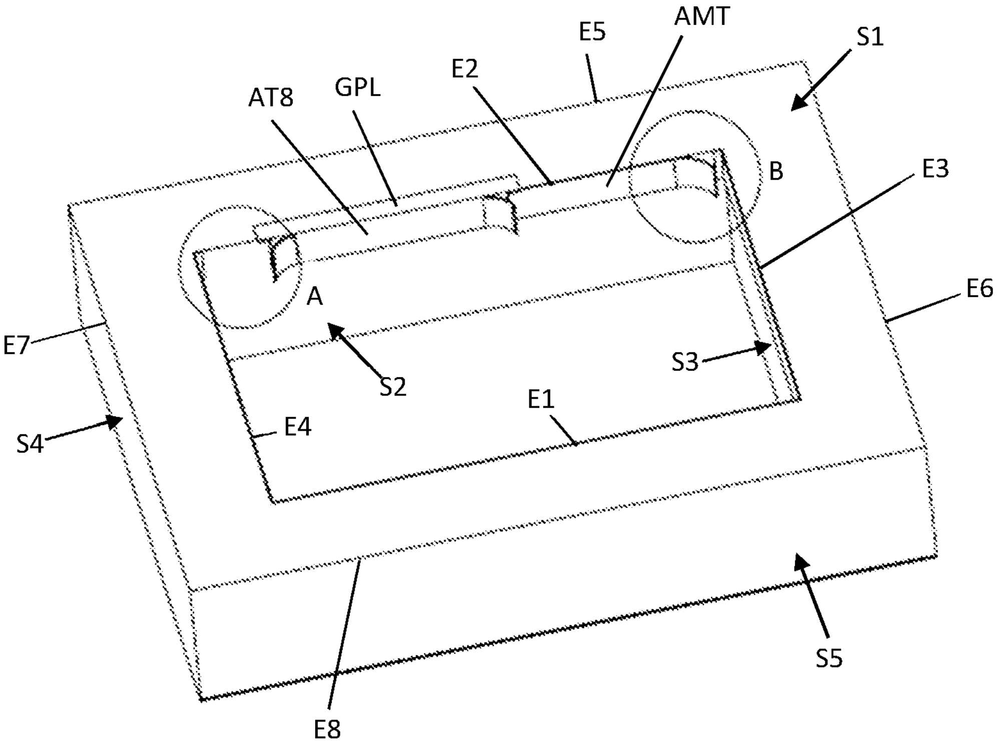
FIGS. 34-34B schematically depict a fourth use of the tape dispenser kit of FIG. 30.
Figure 34A:
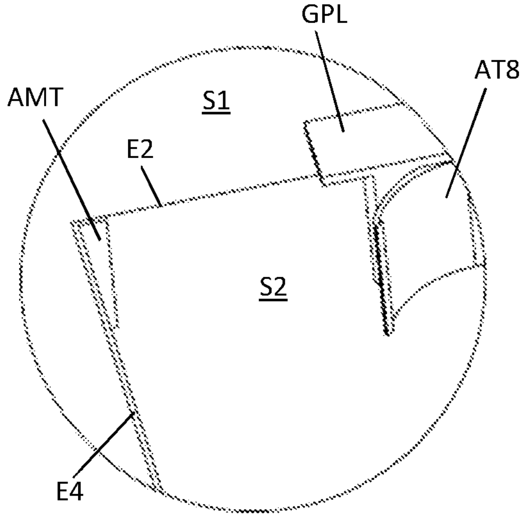
Figure 34B:
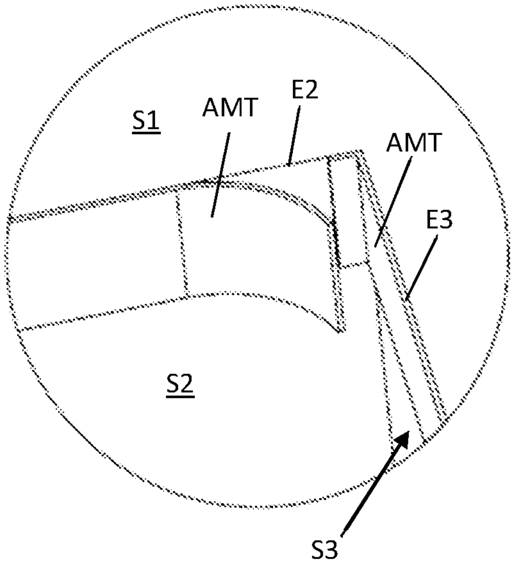

FIG. 34 depicts the application of masking tape on the inner surfaces, e.g. inner surfaces S2 and S3 along the inner edges E5-E8 using attachment ATB, which is similar to attachment AT3 but with guiding plate GPL. The guiding plate GPL is used to engage with top surface S1. FIGS. 34A and 34B show in more detail the corners A and B. From these detailed figures it can be clearly seen that the guiding plate GPL is configured to apply the masking tape with some over length such that the masking tape in the corners overlap.

Although the attachments AT1-AT8 have been described in relation to a specific embodiment of the tape dispenser, it is noted that any one of the attachments AT1-AT8 in principle can also be used in combination with other embodiments, e.g. the embodiment described in relation to FIGS. 1-7.

The invention claimed is:

1. A tape dispenser for applying masking tape for painting to an object, said tape dispenser comprising:

a housing for accommodating a roll of masking tape; and a pressure surface for manually applying pressure to the object while a masking tape portion is present in between the pressure surface and the object in order to apply masking tape to an object, said pressure surface having a length and a width, and said pressure surface having an entry side and an exit side, wherein the length of the pressure surface is at least two times larger than a width of the pressure surface, wherein the housing and pressure surface are configured to guide masking tape from the roll of masking tape via the entry side of the pressure surface along the pressure surface towards the exit side of the pressure surface in a longitudinal direction of the pressure surface, and wherein the tape dispenser further comprises:

a first cutter for cutting masking tape upstream of the entry side of the pressure surface; and a second cutter for cutting masking tape downstream of the exit side of the pressure surface, and wherein the first and second cutters are movable relative with the housing between a first position wherein the first cutter performs a cutting action on a portion of masking tape upstream of the entry side of the pressure surface, an at rest position wherein masking tape can pass the first and second cutters without engagement, and a second position wherein the second cutter performs a cutting action on a portion of masking tape downstream of the exit side of the pressure surface.

2. The tape dispenser according to claim 1, wherein the housing has a symmetrical design about a center plane of the tape dispenser, and wherein the housing is configured such that when a roll of masking tape is accommodated inside the housing, a center plane of the roll of masking tape coincides with the center plane of the tape dispenser.

3. A tape dispenser kit, comprising: the tape dispenser according to claim 2 and one or more attachments or replacements configured to be connected to one or more side walls of the housing whereby a width of the housing can be increased to at one or more predetermined values.

4. The tape dispenser kit according to claim 3, further comprising the roll of masking tape to be accommodated inside the tape dispenser.

5. The tape dispenser kit according to claim 4, wherein a width of the roll of masking tape is substantially equal to a width of a space inside the housing where the roll of tape will be accommodated.

6. The tape dispenser kit according to claim 4, wherein the roll comprises:

a length of masking tape wound as a roll;

a guiding sheet per side surface of the roll of masking tape, wherein the guiding sheets are arranged such that they rotate along with the roll of masking tape when used in the tape dispenser, and wherein a surface of the guiding sheets facing away from the masking tape is configured to slide relative to a side wall of the housing of the tape dispenser.

7. The tape dispenser kit according to claim 6, wherein the roll further includes a core, wherein the length of masking tape is wound around the core, and wherein each guiding sheet at least covers the masking tape at the respective side surface of the roll of masking tape.

8. The tape dispenser according to claim 1, wherein the housing comprises a first spacer arranged at the entry side of the pressure surface and a second spacer arranged at the exit side of the pressure surface, wherein the first spacer defines a first distance between a free end of the first spacer and the entry side of the pressure surface, wherein the second spacer defines a second distance between a free end of the second spacer and the exit side of the pressure surface.

9. The tape dispenser according to claim 8, wherein the housing has a symmetrical design about a center plane of the tape dispenser, and wherein the housing is configured such that when a roll of masking tape is accommodated inside the housing, a center plane of the roll of masking tape coincides with the center plane of the tape dispenser, wherein a length of masking tape extending in use between the entry side of the pressure surface and the first cutter is equal to the first distance minus half a difference between a width of the housing and a maximum width of the masking tape that can be accommodated inside the housing, and wherein a length of masking tape extending in use between the exit side of the pressure surface and the second cutter is equal to the second distance minus half said difference.

10. A tape dispenser kit, comprising: the tape dispenser according to claim 9, and one or more attachments or replacements configured to adjust the length of masking tape extending in use between the entry side of the pressure surface and the first cutter and the length of masking tape extending in use between the exit side of the pressure surface and the second cutter.

11. The tape dispenser kit according to claim 10, further comprising a roll of masking tape to be accommodated inside the tape dispenser.

12. The tape dispenser according to claim 8, wherein the first distance is equal to the second distance.

13. The tape dispenser according to claim 1, further comprising an actuation system to selectively operate the first cutter and the second cutter.

14. The tape dispenser according to claim 13, wherein the actuation system comprises a sliding element to be engaged by user's hand, wherein the housing is configured to guide the sliding element in a longitudinal direction of the housing, and wherein the actuation system is configured such that moving the sliding element in a direction towards the entry side of the pressure surface causes a cutting action of the first cutter and such that moving the sliding element in a direction towards the exit side of the pressure surface causes a cutting action of the second cutter.

15. The tape dispenser according to claim 1, further comprising a first clamping mechanism for clamping the masking tape to a housing part at a location upstream of the first cutter.

16. The tape dispenser according to claim 1, further comprising a second clamping mechanism for clamping the masking tape to a housing part at a location downstream of the second cutter.

17. A tape dispenser for applying masking tape for painting to an object, said tape dispenser comprising:

a housing for accommodating a roll of masking tape, said roll of masking tape having a width and carrying a length of masking tape; and a pressure surface for applying pressure to the object while a masking tape portion is present in between the pressure surface and the object, said pressure surface having a length and a width, and said pressure surface having an entry side and an exit side, wherein the length of the pressure surface is at least two times larger than a width of the pressure surface, wherein the housing and pressure surface are configured to guide masking tape from the roll of masking tape via the entry side of the pressure surface along the pressure surface towards the exit side of the pressure surface in a longitudinal direction of the pressure surface, and wherein the tape dispenser further comprises:

a first cutter for cutting masking tape upstream of the entry side of the pressure surface; and a second cutter for cutting masking tape downstream of the exit side of the pressure surface;

further comprising an actuation system to selectively operate the first cutter and the second cutter; and wherein the actuation system comprises a sliding element to be engaged by user's hand, wherein the housing is configured to guide the sliding element in a longitudinal direction of the housing, and wherein the actuation system is configured such that moving the sliding element in a direction towards the entry side of the pressure surface causes a cutting action of the first cutter and such that moving the sliding element in a direction towards the exit side of the pressure surface causes a cutting action of the second cutter.

* * * * *